(12) United States Patent
Schulz et al.

(10) Patent No.: US 11,680,127 B2
(45) Date of Patent: Jun. 20, 2023

(54) PROCESS FOR THE PRODUCTION OF GRAFT COPOLYMER POWDER COMPOSITIONS AND THERMOPLASTIC RESIN COMPOSITIONS

(71) Applicant: INEOS STYROLUTION GROUP GMBH, Frankfurt am Main (DE)

(72) Inventors: Tobias Schulz, Cologne (DE); Wolfgang Fischer, Heidelberg (DE); Ulrich Jansen, Dormagen (DE); Gisbert Michels, Leverkusen (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 298 days.

(21) Appl. No.: 17/267,906

(22) PCT Filed: Aug. 27, 2019

(86) PCT No.: PCT/EP2019/072767
§ 371 (c)(1),
(2) Date: Feb. 11, 2021

(87) PCT Pub. No.: WO2020/043690
PCT Pub. Date: Mar. 5, 2020

(65) Prior Publication Data
US 2021/0163653 A1    Jun. 3, 2021

(30) Foreign Application Priority Data

Aug. 29, 2018 (EP) ................................ 18191380

(51) Int. Cl.
| | | |
|---|---|---|
| C08F 285/00 | (2006.01) | |
| C08F 2/22 | (2006.01) | |
| C08F 6/00 | (2006.01) | |
| C08F 212/08 | (2006.01) | |
| C08F 220/44 | (2006.01) | |
| C08L 51/00 | (2006.01) | |
| C08L 55/02 | (2006.01) | |

(52) U.S. Cl.
CPC .............. C08F 285/00 (2013.01); C08F 2/22 (2013.01); C08F 6/005 (2013.01); C08F 212/08 (2013.01); C08F 220/44 (2013.01); C08L 51/003 (2013.01); C08L 55/02 (2013.01)

(58) Field of Classification Search
CPC ....... C08F 220/04; C08F 212/08; C08L 55/02
See application file for complete search history.

(56) References Cited

U.S. PATENT DOCUMENTS

| | | |
|---|---|---|
| 3,553,167 A | 1/1971 | Schnell et al. |
| 4,009,226 A | 2/1977 | Ott et al. |
| 4,075,173 A | 2/1978 | Maruyama et al. |
| 4,156,069 A | 5/1979 | Prevorsek et al. |
| 4,181,788 A | 1/1980 | Wingler et al. |
| 4,189,567 A | 2/1980 | Branlard et al. |
| 4,224,419 A | 9/1980 | Swoboda et al. |
| 4,311,823 A | 1/1982 | Imai et al. |
| 4,334,053 A | 6/1982 | Freitag et al. |
| 4,605,699 A | 8/1986 | Mitulla et al. |
| 4,634,734 A | 1/1987 | Hambrecht et al. |
| 4,772,743 A | 9/1988 | Schmidt et al. |
| 4,788,253 A | 11/1988 | Hambrecht et al. |
| 4,880,875 A | 11/1989 | Wassmuth et al. |
| 4,982,014 A | 1/1991 | Freitag et al. |
| 5,071,946 A | 12/1991 | Schmidt et al. |
| 5,100,945 A | 3/1992 | Schmidt et al. |
| 5,314,990 A | 5/1994 | Jansen et al. |
| 5,910,276 A | 6/1999 | Guntherberg et al. |
| 5,958,316 A | 9/1999 | Guntherberg et al. |
| 6,608,139 B1 | 8/2003 | Guntherberg et al. |
| 8,486,530 B2 | 7/2013 | Matsumura et al. |
| 2003/0181583 A1 | 9/2003 | Duijzings et al. |
| 2003/0125420 A1 | 11/2003 | Hamilton et al. |
| 2012/0003478 A1 | 1/2012 | Matsumura et al. |

(Continued)

FOREIGN PATENT DOCUMENTS

| | | |
|---|---|---|
| CA | 1173998 A | 9/1984 |
| CN | 1287132 A | 3/2001 |

(Continued)

OTHER PUBLICATIONS

Scholtan et al., "Bestimmung der Teilchengrobenverteilung von Latices mit der Ultrazentrifuge," Kolloid-Z. u. Z. Polymere 250, 1972, pp. 782-796; see specification for relevancy at p. 14, lines 17-18.

Wohlleben et al., "Measurement of Particle Size Distribution of Polymer Latexes," 2010, Editors: L. Gugliotta, J. Vegam p. 130-153.

Lange, "Bestimmung von Teilchengroben aus Trubung und Brechungsinkrement," Kolloid-Z. u. Z. Polymere, Band 223, Heft 1, 1967, pp. 24-30; see specification for relevancy at p. 14, lines 10-11.

*Primary Examiner* — Jeffrey C Mullis

(74) *Attorney, Agent, or Firm* — Raphael Bellum PLLC

(57) ABSTRACT

The present invention is directed to a process for the production of graft copolymer compositions which are based on acrylonitrile-styrene-acrylate (ASA) or acrylonitrile-butadiene-styrene (ABS) graft copolymers. The graft copolymers compositions are obtained by emulsion polymerization and afterwards precipitation, dewatering, drying and optionally cooling of the dried graft copolymer powder, wherein the graft copolymer B powder obtained is mixed with an aeration gas, preferably air and/or nitrogen, wherein the bulk density of the graft copolymer B powder is equal or less than 98.5% of the bulk density of the non-aerated graft copolymer B, during the whole aeration step. The graft copolymer powders show higher powder flowability and less tendency of caking during storage, for example in a silo.

16 Claims, No Drawings

(56) References Cited

U.S. PATENT DOCUMENTS

| | | |
|---|---|---|
| 2014/0329100 A1 | 11/2014 | Pepers et al. |
| 2016/0297957 A1 | 10/2016 | Boeckmann et al. |
| 2018/0355160 A1 | 12/2018 | Michels et al. |
| 2019/0264021 A1 | 8/2019 | Fischer et al. |

FOREIGN PATENT DOCUMENTS

| | | |
|---|---|---|
| CN | 102361916 A | 2/2012 |
| DE | 1260135 A | 2/1968 |
| DE | 2021398 A | 11/1970 |
| DE | 1495626 B1 | 6/1971 |
| DE | 2232877 A1 | 1/1974 |
| DE | 2420358 A1 | 12/1975 |
| DE | 2703376 A1 | 8/1977 |
| DE | 2714544 A1 | 10/1977 |
| DE | 2815098 A1 | 10/1978 |
| DE | 2724360 A1 | 12/1978 |
| DE | 2826925 A1 | 1/1980 |
| DE | 3000610 A1 | 7/1980 |
| DE | 2940024 A1 | 4/1981 |
| DE | 3007934 A1 | 9/1981 |
| DE | 3149358 A1 | 6/1983 |
| DE | 3414118 A1 | 10/1985 |
| DE | 3615607 A1 | 11/1987 |
| DE | 3639904 A1 | 6/1988 |
| DE | 3832396 A1 | 2/1990 |
| DE | 3913509 A1 | 10/1998 |
| DE | 19906064 A1 | 8/2000 |
| EP | 0022200 A1 | 1/1981 |
| EP | 0111260 A1 | 6/1984 |
| EP | 0459161 A2 | 12/1991 |
| EP | 0734825 A1 | 10/1996 |
| EP | 1080860 A1 | 3/2001 |
| EP | 1319674 A3 | 12/2004 |
| GB | 1124911 A | 8/1968 |
| JP | 2015071661 A | 4/2015 |
| JP | 2016204648 A | 12/2016 |
| JP | 2016204649 A | 12/2016 |
| JP | 2017119804 A | 7/2017 |
| WO | 2002/10222 A1 | 2/2002 |
| WO | 2012/080407 A1 | 6/2012 |
| WO | 2015/078751 A1 | 6/2015 |
| WO | 2017/093468 A1 | 6/2017 |
| WO | 2018/060111 A1 | 4/2018 |
| WO | 2020/020834 A1 | 1/2020 |

PROCESS FOR THE PRODUCTION OF GRAFT COPOLYMER POWDER COMPOSITIONS AND THERMOPLASTIC RESIN COMPOSITIONS

The present invention is directed to a process for the production of graft copolymer compositions which are based on acrylonitrile-styrene-acrylate (ASA) or acrylonitrile-butadiene-styrene (ABS) graft copolymers. The graft copolymers compositions are obtained by emulsion polymerization and afterwards precipitation, dewatering, drying and optionally cooling of the dried graft copolymer powder, wherein the graft copolymer B powder obtained is mixed with an aeration gas, preferably air and/or nitrogen, wherein the bulk density of the graft copolymer B powder is equal or less than 98.5% of the bulk density of the non-aerated graft copolymer B, during the whole aeration step. The graft copolymer powders show higher powder flowability and less tendency of caking during storage, for example in a silo.

Furthermore, the invention relates to a process for the production of a thermoplastic molding composition comprising at least one thermoplastic styrene copolymer, in particular a styrene-acrylonitrile copolymer, the graft copolymer composition obtained by the inventive process, and optional further components.

ABS copolymers and ASA copolymers have already been used for decades in large quantities as thermoplastic molding compositions for the production of moldings of various types. It is known that styrene-acrylonitrile (SAN) and/or α-methylstyrene-acrylonitrile (AMSAN) copolymer can be modified for improved impact resistance by incorporating one or more graft rubbers (also referred to as graft copolymers in the following), such as grafted polybutadiene rubbers or grafted cross-linked acrylates. These impact-modified SAN molding compositions can be produced by polymerization of styrene and acrylonitrile in the presence of e.g. a polybutadiene rubber and/or by subsequent blending of a graft copolymer with a separately produced styreneacrylonitrile matrix.

It is possible to achieve wide variations of the property profiles of the molding compositions and of the moldings produced therefrom. Particularly important properties of ABS and ASA molding compositions are advantageous mechanical properties, such as high toughness and impact resistance, good processability and relatively high heat resistance.

Typically, the graft rubber copolymers are produced by preparing crosslinked acrylate latices or butadiene latices as graft bases via emulsion polymerization and afterwards preparing one or more graft shells by grafting a mixture of e.g. styrene and acrylonitrile or corresponding monomers via graft emulsion polymerization. WO 2015/078751 describes the influence of the particle size of the graft copolymer latex on mechanical properties of the impact-modified thermoplastic compositions.

After the emulsion polymerization the graft copolymer latex is usually precipitated using salt and/or acid solution yielding a suspension of coarse particles, for example the particle mean diameter $D_{50}$ is in the range of 500 to 1500 µm (e.g. determined by sieve analysis). Precipitation (referred to as coagulation) of polymer latices by using metal cations is well known and described in many documents, e.g. DE-A 2 021 398, DEA 2 815 098 and EP-B 0 459 161. Often the majority of water is removed by centrifugation or filtration from this suspension. The resulting rubber is a wet powder and may then directly be fed to an extruder for primary compounding and dewatering (see e.g. EP-A 0 734 825). Alternatively, the resulting rubber wet powder may be dried using common methods.

ASA and ABS graft copolymers are typically used in form of a dry powder in the subsequent compounding steps. Often, such graft copolymer powders need to be stored, e.g. in silos, e.g. comprising tons of polymer, before subsequent processing. In general, such powders tend to caking and time consolidation in the storage silo. As a consequence it is difficult or even impossible to discharge the graft copolymer powder out of the silo. This behavior is a serious problem in production, due to the fact, that it aggravates transporting and feeding the rubber powder to an extruder. This invention describes a process to overcome these drawbacks.

It was surprisingly found that by cooling the graft copolymer powder after the drying step in a cooling gas stream at a temperature of equal or less than 50° C., preferably equal or less than 40° C., caking and time consolidation of the powder can be significantly reduced or even prevented. Furthermore, it has been found that aeration of the graft copolymer powder during storage, preferably at a temperature equal or less than 50° C., significantly prevents caking and time consolidation. For example aeration can be done by external recirculating, wherein a certain amount of the graft copolymer powder is transported through a conveying with air from the outlet of the storage silo back to the top of the storage silo.

The present invention is directed to a process for the production of a graft copolymer composition comprising (preferably consisting of):

B: from 90 to 100% by weight, preferably 95 to 100% by weight, of at least one graft copolymer B comprising:
  B1: 50 to 90% by weight, preferably 55 to 90% by weight, more preferably 55 to 65% by weight, based on the graft copolymer B, of at least one graft base B1, obtained by emulsion polymerization of:
    B11: 50 to 100% by weight, preferably 87 to 99.5% by weight, based on the graft base B1, at least one monomer B11 selected from $C_1$-$C_8$ alkyl(meth)acrylate (preferably n-butylacrylate) and butadiene;
    B12: 0 to 10% by weight, preferably 0.1 to 5% by weight, more preferably 1 to 2.5% by weight, based on the graft base B1, of at least on polyfunctional cross-linking monomer B12; preferably selected from allyl(meth)acrylate, divinylbenzene, diallylmaleate, diallylfumarate, diallylphthalate, triallylcyanurat, triallylisocyanurat and dihydrodicyclopentadienyl acrylate (DCPA)
    B13 0 to 50% by weight, preferably 0 to 20% by weight, more preferably 0 to 10% by weight, based on the graft base B1, of at least one further monomer B13 selected from styrene, alpha-methylstyrene, $C_1$-$C_4$-alkylstyrene, acrylonitrile, methacrylonitrile, isoprene, butadiene, chloroprene, methylmethacrylate, alkylenglycol-di(meth)acrylate, and vinylmethylether;
  where the sum of B11, B12 and B13 equals 100% by weight; and
  B2: 10 to 50% by weight, preferably 10 to 45% by weight, more preferably 30 to 45% by weight, based on the graft copolymer B, at least one graft shell B2, which is obtained via emulsion polymerization in the presence of the at least one graft base B1 of:
    B21 50 to 100% by weight, preferably 50 to 95% by weight, more preferably 65 to 80% by weight, most preferably 75 to 80% by weight, based on graft shell B2, of at least one vinylaromatic monomer B21, selected from styrene, alpha-methylstyrene or mixtures of styrene and at least one further monomer selected from alpha-methylstyrene, p-methylstyrene and $C_1$-$C_8$ alkyl(meth)acrylate (preferably $C_1$-$C_4$ alkyl(meth)acrylate, e.g. methyl methacrylate or ethyl methacrylate); and B22 0 to 50% by weight, preferably 5 to 50% by weight, more preferably 20 to 35% by weight, most preferably 20 to 25% by weight, based on graft shell B2, of at least one monomer B22 selected from acrylonitrile or mixtures of acrylonitrile and at least one further monomer selected from methacrylonitrile, acrylamide, vinylmethyl ether, anhydrides of unsaturated carboxylic acids (e.g. maleic anhydride or phthalic acid anhydride) and imides of unsaturated carboxylic acids (e.g. N-substituted maleimides, like N-cyclohexylmaleimide or N-phenylmaleimide);

where the total sum of graft base B1 and graft shell B2 equals 100% by weight,

K1: from 0 to 10% by weight, preferably 0 to 5% by weight of at least one other component K1, comprising the following steps:
a) preparation of the at least one graft copolymer B encompassing emulsion polymerization of the monomers B21 and B22 in the presence of the at least one graft base B1 to form the at least one graft shell B2, wherein the graft copolymer B is obtained in form of a latex;
b) precipitation of the at least one graft copolymer B latex after its emulsion polymerization in step a), wherein the graft copolymer B latex is mixed with at least one precipitation solution PS resulting in a precipitation mixture;
c) mechanical dewatering of the precipitated graft copolymer B, where the graft copolymer B having a water content equal or less than 50% by weight, preferably equal or less than 40% by weight, is obtained;
d) optionally washing of the dewatered graft copolymer B;
e) drying of the dewatered graft copolymer B obtained in step c) or d) using a drying gas having a temperature in the range from 50 to 160° C. wherein a graft copolymer B powder is obtained;
f) optionally cooling of the dried graft copolymer B powder obtained in step e) using a cooling gas, where the temperature of the cooling gas is equal or less than 50° C., preferably equal or less than 40° C.; more preferably equal or less than 30° C., and wherein the cooling gas is passed through the graft copolymer B powder;
g) aeration of the graft copolymer B, wherein the graft copolymer B powder obtained in step e) or f) is mixed with an aeration gas, wherein the bulk density of the graft copolymer B powder is equal or less than 98.5%, preferably 97.5%, of the bulk density of the non-aerated graft copolymer B, during the whole aeration step g);
h) optionally addition of one or more optional components K1, preferably selected from stabilizers, demolding agents, plasticizers and pigments.

Preferably, the graft copolymer composition obtained by the process is a graft copolymer B powder having a water content below 5% by weight, preferably below 1% by weight, preferably in the range from 0.05 to 0.8% by weight, preferably from 0.1 to 0.5% by weight, particularly preferably from 0.1 to 0.3% by weight.

Preferably, the graft copolymer composition obtained by the inventive process is a powder having a Jenike flow factor FFC value (flowability), determined according to ASTM 6773-2008, of equal or more than 2, preferably equal or more than 3, preferably more than 2, preferable more than 3. Preferably said flowability is maintained over the whole aeration step g). Preferably said flowability is maintained at storage (without aeration) for up to 24 hours, preferably for up to 12 hours. In particular flowability is maintained after a storage at a temperature of equal or less than 50° C., preferably equal or less than 40° C.; more preferably equal or less than less than 30° C.

Graft Copolymer B

The graft copolymer composition comprises at least 90% by weight, preferably at least 95% by weight, based on the total graft copolymer composition, of at least one graft copolymer B. Preferred embodiments are described in the following.

Preferably, the graft copolymer B is selected from ASA graft copolymers and ABS graft copolymers. ASA graft copolymers typically comprise a crosslinked polyalkyl (meth)acrylate rubber as graft base B1, in particular a cross-linked polybutyl-acrylate graft base B1. ABS graft copolymers typically comprise one ore more polybutadiene rubbers and/or a styrene-butadiene rubber(s) as graft base B1.

Typically, the graft base B1 consists of a polymer, preferably an at least partially crosslinked polymer, with glass transition temperature below 0° C., preferably below −20° C., more preferably below −40° C., wherein the glass transition temperature $T_g$ is measured by dynamic mechanical analysis (DMA) using a frequency of 1 Hz.

The at least one graft shell B2 typically consists of monomers which copolymerize yielding a polymer with a glass transition temperature of more than +20° C., preferably more than +60° C. Preferred monomers of graft shell B2 (monomers B21 and B22) are selected from styrene, α(alpha)-methylstyrene, (meth)acrylonitrile, methyl(meth)acrylate, ethylacrylate, N-phenylmaleic imide and maleic anhydride.

Preferred monomers B11 for producing graft base B1 are butadiene, alkylacrylates and/or alkylmethacrylate (also referred to as alkyl(meth)acrylates) with 1 to 8, preferably 4 to 8, carbon atoms being present in the alkyl group. Preferably, the monomer B11 is at least one monomer selected from $C_4$-$C_8$ alkyl acrylates, preferably selected from butyl acrylate, ethylhexyl acrylate and cyclohexyl acrylate. Often n-butylacrylate and/or 2-ethylhexylacrylate are used, more preferred is n-butylacrylate alone or in mixture with other monomers B11, as monomer B11.

In order to have cross-linking of the $C_1$-$C_8$-alkyl(meth)acrylate monomers B11 and therefore cross-linking of the graft base B1, monomers B11 are polymerized in presence of 0.1 to 10% by weight, preferably 0.1 to 5% by weight, preferably 0.5 to 3% by weight, preferably 1 to 4% by weight, more preferably 1 to 2.5% by weight, based on the graft base B1, of one or more polyfunctional, cross-linking monomer(s) B12. Suitable monomers B12 are especially polyfunctional, cross-linking monomers that can be copolymerized with the mentioned monomers, especially B11 and B13. Suitable polyfunctional, cross-linking monomers B12 comprise two or more, preferred two or three, more preferred exactly two ethylenic double bonds, which are preferably not 1,3 conjugated. Examples for suitable polyfunctional, cross-linking monomers B12 are allyl(meth)

acrylate, divinylbenzene, diallylester of carboxylic diacids, like e.g. diallymaleate, diallylfumarate and diallylphthalate. The acrylic acid ester of tricyclodecenyl alcohol (tricyclodecenylacrylate, dihydrodicyclopentadienyl acrylate, DCPA), as described in DE-A 1 260 135, represents also a preferred polyfunctional, cross-linking monomer B12.

Especially, the polyfunctional, cross-linking monomer B12 (preferably used for crosslinking of polyalkyl(meth)acrylate rubber) is at least one monomer selected from allyl(meth)acrylate (AMA), divinylbenzene, diallymaleate, diallylfumarate, diallylphthalate, triallylcyanurate, triallylisocyanurate and dihydrodicyclopentadienyl acrylate (DCPA), preferably allyl(meth)acrylate, divinylbenzene, diallylmaleate, diallylfumarate, diallylphthalate and DCPA, preferably from ally(meth)acrylate and DCPA.

In a preferred embodiment 1 to 2.5% by weight, preferably 1.5 to 2.2% by weight, based on the graft base B1, dihydrodicyclopentadienyl acrylate (DCPA) are used alone or in a mixture with at least one further of the above mentioned monomers B12, especially in mixture with allyl (meth)acrylate, as monomer B12.

Furthermore, the at least one graft base B1 can comprise optionally one or more copolymerizable, monoethylenically unsaturated monomers B13, different from B11 and B12. Monomers B13 can for example be selected from butadiene, isoprene, styrene, acrylonitrile, methyl(meth)acrylate and vinylmethylether.

Preferably, the further monomer B13 is at least one monomer selected from styrene, $\alpha$(alpha)-methylstyrene, acrylonitrile; methacrylonitrile, methyl(meth)acrylate, isoprene, chloroprene, and $C_1$-$C_4$ alkyl styrene.

In a preferred embodiment the vinylaromatic monomer B21 (in particular each of monomers B21, B21' and B21") is styrene and/or $\alpha$(alpha)-methylstyrene and the at least one ethylenically unsaturated monomer B22 (in particular each of monomers B22 and B22") is acrylonitrile or a mixture of acrylonitrile and at least one monomer selected from methacrylonitrile, acrylamide, vinylmethylether, maleic acid anhydride, phthalic acid anhydride, N-cyclohexylmaleimide and N-phenylmaleimide. More preferably, monomers B21 and B22 used for emulsion polymerization of graft copolymer B are mixtures of styrene and acrylonitrile having a weight ratio of styrene to acrylonitrile in the range of 95:5 to 50:50, more preferably in the range of 80:20 to 65:35.

In a preferred embodiment the at least one graft base B1 is obtained by emulsion polymerization of:

B11: 70 to 99.9% by weight, preferably 87 to 99.5% by weight, based on the graft base B1, at least one $C_1$-$C_8$ alkyl(meth)acrylate, preferably n-butylacrylate and/or 2-ethylhexylacrylate, as monomer B11;

B12: 0.1 to 10% by weight, preferably 0.1 to 5% by weight, more preferably 1 to 2.5% by weight, based on the graft base B1, of at least on poly-functional cross-linking monomer B12; preferably selected from allyl(meth)acrylate, divinylbenzene, diallylmaleate, diallylfumarate, diallylphthalate, triallylcyanurat, triallylisocyanurat and dihydrodicyclopentadienyl acrylate (DCPA)

B13 0 to 29.5% by weight, preferably 0 to 25% by weight, more preferably 0 to 10% by weight, based on the graft base B1, of at least one further monomer, preferably selected from styrene, alpha-methylstyrene, $C_1$-$C_4$-alkylstyrene, acrylonitrile, methacrylonitrile, isoprene, butadiene, chloroprene, methylmethacrylate, alkylenglycoldi(meth)acrylate, and vinylmethylether wherein the sum of B11, B12 and B13 equals 100% by weight.

In a further preferred embodiment the at least one graft base B1 is obtained by emulsion polymerization of:

B11: 90 to 99.9% by weight, preferably 97 to 99.5% by weight, preferably 97.5 to 99% by weight, based on the graft base B1, at least one $C_1$-$C_8$ alkyl(meth)acrylate, preferably at least one $C_4$-$C_8$-alkyl(meth)acrylate, more preferably n-butylacrylate and/or 2-ethylhexylacrylate, most preferably n-butylacrylate, as monomer B11; and B12: 0.1 to 10% by weight, preferably 0.5 to 3% by weight, more preferably 1 to 2.5% by weight, based on the graft base B1, at least one polyfunctional, cross-linking monomer B12; selected from allyl(meth)acrylate, divinylbenzene, diallylmaleate, diallylfumarate, diallylphthalate and dihydrodicyclopentadienyl acrylate (DCPA), especially from allyl(meth)acrylate and/or dihydrodicyclopentadienyl acrylate (DCPA);

wherein the sum of B11 and B12 is 100% by weight (based on all monomers of graft base B1).

In particular, further suitable compositions of graft base B1, comprising monomers B11, B12 and optionally B13, as well as the general method for its preparation are described for example in DE-A 28 26 925, DE-A 31 49 358 and DE-A 34 14 118.

In a preferred embodiment the at least one graft shell B2 is obtained by emulsion polymerization in the presence of the at least one graft base B1 of:

B21: 50 to 95% by weight, preferably 65 to 80% by weight, more preferably 70 to 80% by weight, based on the graft shell B2, at least one vinylaromatic monomer B21, wherein the monomer B21 is selected from styrene, $\alpha$(alpha)-methylstyrene or mixtures of styrene and one further monomer selected from $\alpha$(alpha)-methylstyrene, p(para)-methylstyrene, $C_1$-$C_4$-alkyl(meth)acrylate (e.g. methyl(meth)acrylate, ethyl(meth)acrylate), preferably selected from styrene, $\alpha$(alpha)-methylstyrene or mixtures of styrene and $\alpha$(alpha)-methylstyrene or methyl(meth)acrylate, and B22: 5 to 50% by weight, preferably 20 to 45% by weight, more preferably 20 to 40% by weight, also preferably 20 to 36% by weight, also preferably 20 to 33% by weight, based on the graft shell B2, at least one ethylenically unsaturated monomer B22, wherein the monomer B22 is selected from acrylonitrile or mixtures of acrylonitrile and at least one further monomer selected from methacrylonitrile, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmalimide), preferably selected from acrylonitrile or mixtures of acrylonitrile and methacrylonitrile.

Particularly, the graft copolymer B comprises a graft base B1, preferably a cross-linked polyalkyl(meth)acrylate rubber described above, and one or more graft shell(s) B2, in particular one, two or three graft shells B2, which differ in selection and amount of monomers B21 and B22 and which are obtained by stepwise grafting emulsion polymerization of the monomers B21 and/or B22 in the presence of graft base B1 res. in the presence of already grafted graft base.

In a preferred embodiment the graft copolymer B comprises at least one graft base B1, preferably a cross-linked polybutylacrylate rubber described above, and exactly one graft shell B2, obtained by emulsion polymerization of monomers B21 and B22 as described above, especially styrene and acrylonitrile, in presence of the graft base B1 (single-stage graft).

In a further preferred embodiment the graft copolymer B comprises at least one graft base B1, preferably a crosslinked polybutylacrylate rubber described above, and two graft shells B2' and B2", wherein B2' is obtained from emulsion polymerization of monomer B21, especially styrene, in presence of graft base B1 and the graft shell B2" is obtained from subsequent emulsion polymerization of monomers B21 and B22 as described above, especially styrene and acrylonitrile, in presence of graft base B1 grafted with B2' (two-stage graft).

In a preferred embodiment (single-stage graft) the graft copolymer B comprises:

B1: 50 to 70% by weight, preferably 55 to 65% by weight, more preferably 58 to 65% by weight, based on the graft copolymer B, at least one, preferably exactly one, graft base B1 as described above, wherein preferably the at least one graft base B1 has a particle size (in particular mean particle diameter $D_w$) in the range of 60 to 200 nm, preferably 60 to 150 nm, more preferably 60 to 100 nm;

B2: 30 to 50% by weight, preferably 35 to 45% by weight, more preferably 35 to 42% by weight, based on the graft copolymer B, one or more, preferably exactly one graft shell B2, obtained by emulsion polymerization, in presence of at least one graft base B1, of:

B21: 50 to 95% by weight, preferably 65 to 80% by weight, more preferably 70 to 80% by weight, based on the graft shell B2, at least one vinylaromatic monomer B21, wherein the monomer B21 is selected from styrene, α(alpha)-methylstyrene or mixtures of styrene and at least one further monomer selected from α(alpha)-methylstyrene, p-methylstyrene and $C_1$-$C_4$-alkyl(meth)acrylate (e.g. methyl(meth)acrylate, ethyl(methacrylate), preferably selected from styrene, α(alpha)methylstyrene or mixtures of styrene with α(alpha)methylstyrene or methyl(meth)acrylate; and B22: 5 to 50% by weight, preferably 20 to 35% by weight, more preferably 20 to 30% by weight, based on the graft shell B2, at least one ethylenically unsaturated monomer B22, wherein the monomer B22 is selected from acrylonitrile or mixtures of acrylonitrile and at least one further monomer selected from methacrylonitrile, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmaleimide), preferably selected from acrylonitrile or mixtures of acrylonitrile an methacrylontrile;

wherein the total sum of graft base B1 and graft shell B2 is 100% by weight, and wherein the graft copolymer B latex obtained in step a) has a particle size (in particular mean particle diameter $D_w$) in the range of 60 to 140 nm.

In another preferred embodiment (two-stage graft B2' and B2") the graft copolymer B comprises:

B1: 50 to 70% by weight, preferably 55 to 65% by weight, more preferably 58 to 65% by weight, based on the graft copolymer B, at least one, preferably exactly one, graft base B1 as described above, wherein preferably the at least one graft base B1 has a particle size (in particular mean particle diameter $D_w$) in the range of 200 to 800 nm, preferably 300 to 600 nm, more preferably 350 to 550 nm;

B2': 10 to 30% by weight, preferably 10 to 20% by weight, more preferably 10 to 15% by weight, based on the graft copolymer B, at least one graft shell B2', which is obtained by emulsion polymerization, in presence of graft base B1, of B21' 100% by weight, based on graft shell B2', at least one vinylaromatic monomer B21', selected from styrene, α(alpha)methylstyrene or a mixture of styrene and at least one further monomer selected from α(alpha)-methylstyrene, p-methylstyrene and $C_1$-$C_4$-alkyl(meth)acrylate (e.g. methyl(meth)acrylate, ethyl(meth)acrylate); and B2": 20 to 40% by weight, preferably 20 to 30% by weight, more preferably 25 to 30% by weight, based on the graft copolymer B, at least one graft shell B2", which is obtained by emulsion polymerization, in presence of graft base B1 grafted with B2', of:

B21": 50 to 95% by weight, preferably 65 to 80% by weight, more preferably 70 to 80% by weight, based on the graft shell B2", at least one vinylaromatic monomer B21", selected from styrene, α(alpha)-methylstyrene or mixtures of styrene and at least one further monomer selected from alpha-methylstyrene, p-methylstyrene and $C_1$-$C_4$-alkyl(meth)acrylate (e.g. methyl(meth)acrylate, ethyl(meth)acrylate), preferably selected from styrene, α(alpha)-methylstyrene or mixtures of styrene and α(alpha)-methylstyrene or methyl(meth)acrylate; and B22": 5 to 50% by weight, preferably 20 to 35% by weight, more preferably 20 to 30% by weight, based on the graft shell B2", at least one ethylenically unsaturated monomer B22", selected from acrylonitrile or mixtures of acrylonitrile and at least one further monomer selected from methacrylonitrile, acrylamide, vinylmethylether, anhydrides of unsaturated carboxylic acids (e.g. maleic acid anhydride, phthalic acid anhydride) and imides of unsaturated carboxylic acids (e.g. N-substituted maleimide, like N-cyclohexylmaleimide and N-phenylmaleimide), preferably selected from acrylonitrile or mixtures of acrylonitrile an methacrylontrile;

wherein the total sum of graft base B1, graft shell B2' and graft shell B2" is 100% by weight, and wherein the graft copolymer B latex obtained in step a) has a particle size (in particular mean particle diameter $D_w$) in the range of 300 to 700 nm.

According to a preferred embodiment, the graft copolymer B is a mixture of the above described embodiments of single-stage graft copolymer B and two-stage graft copolymer B (including graft B2' and B2").

More preferably monomers B21, B21' and B21" are styrene or mixtures of styrene and α-methylstyrene.

More preferably monomers B22 and B22" are acrylonitrile or mixtures of acrylonitrile and at least one further monomer selected from methacrylonitrile, maleic acid anhydride, N-cyclohexylmaleimide, N-phenylmaleimide, more preferably acrylonitrile or mixtures of acrylonitrile and at least one further monomer selected from methacrylonitrile and maleic acid anhydride. In a more preferred embodiment of the invention monomers B21, B21' and B21" are styrene and monomers B22 and B2' are acrylonitrile.

In a preferred embodiment of the invention the inventive process covers the synthesis of at least two, preferably two, three or four, different graft copolymers B-I and B-II, wherein graft copolymers B-I and B-II differ in their particle size. In this preferred embodiment graft copolymer B especially comprises at least two graft copolymers B-I and B-II, preferably based on crosslinked $C_1$-$C_8$ alkyl(meth)acrylate graft bases B1 as described above, wherein:
- graft copolymer B-I (small size ASA rubber) has a particle size (in particular mean particle diameter $D_w$) in the range of 60 to 200 nm, preferably of 80 to 150 nm, more preferably of 90 to 100 nm, and
- graft copolymer B-II (large size ASA rubber) has a particle size (mean particle diameter $D_w$) in the range of 300 to 800 nm, preferably of 300 to 700 nm, more preferably of 400 to 600 nm.

Graft copolymer B-I (small size ASA rubber) is preferably obtained by emulsion polymerization of monomers B21 and B22 as described above, in particular styrene or α(alpha)-methylstyrene as B21 and acrylonitrile as B22, in presence of the previously prepared graft base B1 as described above, for example for single-stage graft copolymer B.

In a preferred embodiment the graft copolymer B is a graft copolymer produced from emulsion polymerization with a core-shell structure comprising a core B1 and three layers B2 to B4, in the sequence B1 to B4 from inside to outwards (for example as described in PCT/EP2019/069698), wherein the graft copolymer is composed of:
B1: 6 to 19% by weight of an inner core B1 comprising at least one copolymer consisting of:
  B11: 95.0 to 99.9% by weight of at least one vinylaromatic monomer, and
  B12: from 0.1 to 5.0% by weight, of at least one bi- or polyfunctional, crosslinking monomer;
B2: 41 to 54% by weight, of an outer core layer B2 grafted onto B1 consisting of at least one copolymer comprising:
  B21: up to 99.0% by weight, of at least one C2-C8-alkyl acrylate;
  B22: 1.0 to 5.0% by weight of one or more bi- or polyfunctional, crosslinking monomers;
B3: 1 to 19% by weight, of a first graft shell layer B3 consisting of at least one vinylaromatic polymer; and
B4: 21 to 39% by weight, of a second graft shell layer B4 consisting of at least one copolymer comprising at least one vinylaromatic monomer B41 and at least one nitrile monomer B42;
where the sum of B1, B2, B3 and B4 adds up to 100% by weight; and
wherein the weight average particle diameter $d_w$ of the graft copolymer B is in the range of from 280 to 450 nm, preferably 310 to 370 nm, more preferably 320 to 360 nm.

Preferably, the graft copolymer B-II (large size ASA rubber) is desired to have a narrow particle size distribution, wherein particle size distribution $Q=(D_{90}-D_{10})/D_{50}$ is less than 0.3, preferably less than 0.2.

In another embodiment the graft copolymer B can be an ABS graft copolymer comprising
B1: 40 to 80% by weight, preferably 50 to 70% by weight, more preferably 55 to 65% by weight, based on the graft copolymer B, of at least one graft base B1, obtained by emulsion polymerization of butadiene as monomer B1; and
B2: 20 to 60% by weight, preferably 30 to 50% by weight, more preferably 35 to 45% by weight, based on the graft copolymer B, at least one graft shell B2, as described above, preferably obtained via emulsion polymerization in the presence of the at least one graft base B1, of 65 to 80% by weight, most, based on graft shell B2, of styrene as monomer B21, and 20 to 35% by weight, based on graft shell B2, of acrylonitrile as monomer B22;
wherein the total sum of graft base B1 and graft shell B2 equals 100% by weight; and wherein the ABS graft copolymer B latex has a particle size (in particular mean particle diameter $D_w$) in the range of 100 to 500 nm.

Typically, particle size of graft copolymer B latices can be given as the weight mean average particle diameter $D_w$ value. For example the weight mean average particle diameter $D_w$ can be determined using turbidity measurement as described in H. Lange, Kolloid-Zeitschrift and Zeitschrift für Polymere, volume 223, issue 1. The weight mean average particle diameter $D_w$ (or De Broucker mean particle diameter), also referred to as mean particle diameter $D_w$, is an average size based on unit weight of particle.

Further, the particle size can be given as the median particle size $D_{50}$, for example determined from the particle size distribution obtained via ultracentrifuge measurement (described in W. Scholtan, H. Lange, Kolloid-Z. u. Z. Polymere 250, pages 782 to 796, 1972), electron microscopy or hydrodynamic chromatography HDC (for example described in W. Wohlleben, H. Schuch, "Measurement of Particle Size Distribution of Polymer Latexes", 2010, Editors: L. Gugliotta, J. Vega, pages 130-153). The median particle diameter $D_{50}$ represents the value of the particle size distribution curve where 50 Vol.-% of the particles (e.g. polyacrylate latex particles) have diameter smaller than the $D_{50}$ value and the other 50 Vol.-% have diameter larger than the $D_{50}$ value. In similar way for example the $D_{90}$ values gives the particle diameter, where 90 Vol.-% of all particles have a smaller diameter.

Preferably, the particle size mentioned in the present invention in connection with the graft copolymer B means the weight mean average particle diameter $D_w$ value determined using turbidity measurement, for example as described in Lange, Kolloid-Zeitschrift and Zeitschrift für Polymere, volume 223, issue 1.

Suitable crosslinked $C_1$-$C_8$ alkyl(meth)acrylate polymer graft bases B1 of graft copolymer B-II (referred to as B1-II) can be produced according to known procedures for the production of large size dispersion, conveniently via seeded polymerization, as described in DE 1 911 882 for the production of ASA polymers. According to this method a small size, cross-linked acrylate latex (seed latex) having particle size (in particular mean particle diameter $D_w$) from 50 to 180 nm, preferably less than 120 nm, which is obtained from emulsion polymerization of $C_1$-$C_8$-alkyl(meth)acrylates as monomers B11, cross-linking monomers B12 and optionally further co-monomers B13, is subjected to a further polymerization reaction. In particular, the reaction conditions are adjusted in way only allowing further growth of the present seed latex particles, without forming new latex particles (described in Journal of Applied Polymer Science, Vol. 9 1965, pages 2929 to 2938). Normally an initiator is used in said method.

The particle size of the resulting graft copolymer B-II (large size rubber) can be adjusted by variation of the ratio of seed latex to monomers. Graft copolymer B-II is preferably obtained by emulsion polymerization of monomers B21 and B22 as described above, in particular styrene or α(alpha)-methylstyrene as B21 and acrylonitrile as B22, in presence of the previously prepared graft base B1-II.

Preferably the above described graft copolymers B-I and B-II are prepared, precipitated and dewatered separately in steps a) to c) and optionally d) to f). It is also possible to mix graft copolymer latices B-I and B-II after producing them separately in step a) and to precipitate them together in step b). Following steps, such as dewatering in step c), and washing in step d) can be carried out as described.

The weight ratio of graft copolymers B-I and B-II can be varied in wide ranges. Preferably the graft copolymer B is a mixture of graft copolymer B-I and B-II, wherein the weight ratio of B-I:B-II is from 90:10 to 10:90, preferably 80:20 to 20:80 and more preferably 70:30 to 35:65.

It is also possible to obtain graft copolymers B with different particle sizes, especially bimodal particle size distributions from 60 to 200 nm and 300 to 800 nm, via known agglomeration procedures. Graft copolymers with large and small size particles are for example described in DE-A 36 15 607.

Furthermore graft copolymers B having two or more different graft shells B2 can be used as described above. Further, graft copolymers with multi-layer graft shells are for example described in EP-A 0111260 and WO 2015/078751.

Step a)—Preparation of the Graft Copolymer B by Emulsion Polymerization

The method encompasses the preparation of the at least one graft copolymer B encompassing the emulsion polymerization of the monomers B21 and B22 in the presence of the at least one graft base B1 to form the at least one graft shell B2, wherein the graft copolymer B is obtained in form of a latex.

Often the graft copolymer B has a complex structure and is in essence composed of one or more graft base(s) B1 and one or more graft shell(s) B2. Typically, the graft copolymer B is produced in form of a latex (rubber) by emulsion polymerization in step a), wherein firstly one or more graft base(s) B1 are obtained by emulsion polymerization of the monomers B11, B12 and optionally B13 as described and afterwards one or more graft shell(s) B2 are obtained by graft emulsion polymerization of the monomers B21 and B22 as described in the presence of one or more of the graft base B1.

Preferably, the graft copolymer B latex is polymerized by aqueous free-radical emulsion polymerization. The reaction is typically initiated via water-soluble or oil-soluble free-radical polymerization initiators, e.g. inorganic or organic peroxides, such as peroxodisulfate or benzoyl peroxide, or with the aid of redox initiator systems. The documents WO 2002/10222, DE-A 28 26 925, and also EP-A 022 200 describe suitable polymerization processes.

Initiators used in the production of the graft base B1 and/or in the emulsion polymerization of the at least one graft copolymer B can be any desired initiators. It is preferred to use at least one organic and/or inorganic peroxide compound (comprising at least one peroxide group R—O—O—H and/or R—O—O—R) as initiator, e.g. hydrogen peroxide, cumene hydroperoxide, tert-butyl hydroperoxide, p-methane hydroperoxide, ammonium persulfate, potassium persulfate or sodium persulfate. In particular, inorganic peroxide salts are used, examples being peroxodisulfates (persulfates), perphosphates and perborates of ammonium, sodium or potassium. Particular preference is given to sodium persulfates and potassium persulfates.

In a preferred embodiment, an inorganic peroxide salt, in particular an inorganic peroxodisulfate salt, preferably sodium peroxodisulfate and/or potassium peroxodisulfate, is used in the emulsion polymerization of the graft copolymer B.

Emulsifier used in the production of the graft base B1 and/or in the emulsion polymerization to produce the at least one graft copolymer B can typically comprise conventional anionic emulsifiers. Preference is given to the use of the following as emulsifiers: alkyl sulfates, alkylsulfonates, alkyl sulfonic acids, arylsulfonates, soaps of saturated or unsaturated fatty acids, and also alkaline disproportionated or hydrogenated abiatic or tall oil acids or a mixture thereof.

It is preferable to use emulsifiers having carboxy groups (e.g. disproportionated abiatic acid, salts of $C_{10}$-$C_{18}$-fatty acids, emulsifiers of DE-A 36 39 904 and DE-A 39 13 509). In a preferred embodiment $C_{10}$-$C_{20}$ alkyl sulfonic acids and/or $C_{10}$-$C_{20}$ alkylsulfonates, for example a $C_{12}$-$C_{18}$ paraffin sulfonic acid, are used as emulsifier.

In another preferred embodiment, emulsifiers used can comprise alkaline soaps of sodium salts and potassium salts of disproportionated and/or dehydrogenated and/or hydrogenated and/or partially hydrogenated resins (rosin) with at least 30% by weight content of dehydroabiatic acid and with at most 1% by weight content of abiatic acid.

It is moreover possible in the emulsion polymerization of the graft base B1 and the graft shell B2 to use salts, acids and bases, in particular to adjust the pH or to buffer the reaction mixture. For example sulfuric acid, phosphoric acid, solutions of sodium hydroxide, potassium hydroxide, sodium salts and potassium salts of carbonates, bicarbonates, sulfates and/or phosphates (e.g. tetrasodium pyrophosphate) can be used. In a preferred embodiment at least one carbonate and/or bicarbonate salt, such as sodium bicarbonate, is used as buffer.

The polymerization temperature in the emulsion polymerization of the graft copolymer B is generally from 25 to 160° C., preferably from 40 to 90° C. Conventional temperature control, e.g. isothermal, can be used here; however, conduct of the graft polymerization reaction is preferably such that the temperature difference between start and end of the reaction is at least 10° C., preferably at least 15° C. and particularly preferably at least 20° C.

Typically, the production of the graft copolymer B is achieved in the invention by means of emulsion polymerization. Familiar embodiments of the emulsion polymerization reaction, in batch operation or in continuous operation, are known to the person skilled in the art.

In particular, the monomers of the graft shell B2, i.e. the monomers B21 and B22, separately or in the form of monomer mixture, are continuously added to the graft base B1 in the given quantities and ratios, and polymerized. The monomers here are typically added to the at least one graft base B1 in a manner known to the person skilled in the art. Particularly, the graft copolymer B may comprise two or more graft shells B2 prepared by stepwise polymerization of monomers B21 and/or B22.

Step b)—Precipitation of Graft Copolymer B Latex Using Precipitation Solution PS The inventive method encompasses the precipitation of the at least one graft copolymer B after its emulsion polymerization in step a), wherein the graft copolymer B latex is mixed with at least one precipitation solution PS resulting in a precipitation mixture, wherein preferably the at least one precipitation solution PS comprises at least one salt and/or acid. In particular the precipitation solution PScomprises at least one alkaline-earth metal salt, preferably at least one salt of magnesium and/or calcium; more preferably at least one magnesium salt.

In particular the at least one alkaline-earth metal salt is selected from alkaline-earth metal halogenides, such as chlorides, alkaline-earth metal sulfates, alkaline-earth metal phosphates, such as orthophosphates or pyrophosphates, alkaline-earth metal acetates and alkaline-earth metal formats. Preferably the at least one alkaline-earth metal salt is selected from chlorides and sulfates.

Preferred alkaline-earth metal salts here are magnesium sulfate (such as kieserite ($Mg[SO_4] \cdot H_2O$), pentahydrite ($Mg[SO_4] \cdot 5H_2O$), hexahydrite ($Mg[SO_4] \cdot 6H_2O$), and epsomite ($Mg[SO_4] \cdot 7H_2O$, Epsom salt)), magnesium chloride, calcium chloride, calcium formate, magnesium formate or mixtures thereof. In particular preferred is the use of magnesium sulfate.

In particular the solid content of the precipitation mixture obtained in step b) is in the range of 5 to 20% by weight, preferably 7 to 18% by weight, more preferably 10 to 18% by weight, also preferably 12 to 20% by weight.

Preferably, the pH of the precipitation mixture obtained in step b) is in the range of 5 to 10, preferably in the range of 6 to 9, also preferably 8 to 9. For example the pH can be adjusted by the addition of buffer salts, acids and/or bases, wherein for example sulfuric acid, phosphoric acid, solutions of sodium hydroxide, potassium hydroxide, sodium salts and potassium salts of carbonates (e.g. sodium carbonate $Na_2CO_3$ and/or sodium hydrogen carbonate $NaHCO_3$ or mixtures thereof), sulfates or phosphates (e.g. tetrasodium pyrophosphate) can be used. For example it is preferred to add at least one buffer salt selected from sodium salts, in particular selected from sodium carbonates, sodium sulfates and sodium phosphates, preferably selected from sodium carbonate $Na_2CO_3$ and sodium hydrogencarbonate $NaHCO_3$, The buffer salts, acids and/or bases can be added during steps a) and/or b), preferably during the preparation of the at least one graft copolymer B (emulsion polymerization, step a).

Typically the precipitation solution PS and the graft copolymer B latex are mixed in step b) over a period in the range of 5 to 30 minutes, preferably 5 to 20 minutes.

The precipitation in step b) can be carried out in a temperature range from 20 to 150° C.; preferably from 40 to 100° C., particularly preferably from 45 to 99° C., also preferably 60 to 90° C. Preferably, the graft copolymer B latex is mixed with the at least one precipitation solution PS at a temperature $T_1$ (precipitation temperature) in the range of 30 to 80° C., preferably 35 to 75° C., more preferably 40 to 65° C.

Preferably, the precipitation mixture is kept at a temperature $T_2$ (sintering temperature) in the range of 70 to 140° C., preferably 75 to 135° C., more preferably 90 to 135° C. after mixing the graft copolymer B latex with the at least one precipitation solution PS. In particular the precipitation mixture is kept at said temperature $T_2$ for a period of 2 to 90 minutes, preferably 5 to 80 minutes, more preferably 10 to 70 minutes.

In a preferred embodiment the graft copolymer B latex is mixed with the at least one precipitation solution PS in step b) at a temperature $T_1$ (precipitation temperature) in the range of 30 to 70° C., preferably 40 to 65° C., and afterwards the precipitation mixture is kept for at least 5 minutes at a temperature $T_2$ (sintering temperature) in the range of 70 to 120° C., preferably 80 to 100° C.

Step c)—Mechanical Dewatering of the Precipitated Graft Copolymer B

The method encompasses the mechanical dewatering of the precipitated graft copolymer B (obtained in step b), where a graft copolymer B having a water content equal or less than 50% by weight, preferably equal or less than 40% by weight is obtained.

The water content (also termed residual moisture content) of the graft copolymer B after dewatering is the content of water in percent by weight, based on the moist graft copolymer B obtained after dewatering. The water content is in particular determined with the aid of suitable analysis equipment (e.g. drying and weighing devices), where the sample is dried until constant weight of the sample has been achieved over a defined period. By way of example, the water content of the graft copolymer B can be determined in a Halogen Moisture Analyzer HR73 from Mettler Toledo at 180° C. until constant weight has been achieved for 30 seconds.

Particularly, the water content of the dewatered graft copolymer B obtained in step c) is in the range of 10 to 50% by weight, preferably 20 to 40% by weight, more preferably 20 to 30% by weight (based on the total dewatered graft copolymer B).

Typically, step c) of the invention comprises the mechanical dewatering of the precipitated graft copolymer B by means of continuous or batch-wise centrifugation and/or filtration. Preferably, the mechanical dewatering of the precipitated graft copolymer B is preferably achieved by means of continuous centrifuging. The precipitated graft copolymer B is typically centrifuged with a centripetal acceleration of from 200 to 1500 g (with g is acceleration due to gravity 1 g=9.81 m/s), preferably from 500 to 1300 g, for a period of from 1 second to 5 minutes, preferably from 1 to 120 seconds.

Step d)—Optionally Washing of the Dewatered Graft Copolymer B

In another embodiment, the mechanical dewatering of the graft copolymer B in step c) is combined (e.g. on a centrifuge) or followed by a washing step, where the dewatered graft copolymer B is preferably treated with water. Further, it is possible to use a mixture of water and a polar, water-miscible organic solvent, such as alcohols.

The water or the mixture is preferably removed by filtration and/or centrifugation after the treatment. Preferably, in a downstream washing step d) a graft copolymer B is obtained having a water content in the range from 10 to 50% by weight, preferably from 20 to 40% by weight, with particular preference from 20 to 30% by weight. It is also preferred that a graft copolymer B is obtained having a water content as described above for step c).

For example the washing step can be carried out by addition of water or a mixture of water and a polar, water-miscible organic solvent during the centrifugation, in particular in a continuous centrifugation process.

Step e)—Drying of the Dewatered Graft Copolymer B

The inventive method encompasses the drying of the dewatered graft copolymer B obtained in step c) or d) using a drying gas having a temperature in the range from 50 to 160° C., preferably from 55 to 155° C., more preferably from 60 to 150° C., also preferably from 100 to 160° C., wherein a graft copolymer B powder is obtained. Typically, the temperature of the drying gas given above is the inlet temperature of the drying gas.

Preferably, the graft copolymer B has a temperature of less than 50° C., preferably in the range of 20 to 49° C., more preferably 35° C. to 45° C. during the drying step e). Typically, the temperature of the graft copolymer is the maximum temperature during drying step e), i.e. the temperature of the graft copolymer does not exceed the values given above.

In one embodiment the process encompasses drying of the dewatered graft copolymer B obtained in step c) or in an optional washing step d), in a known manner. For example the dewatered graft copolymer B can be dried by hot drying gas, e.g. air or nitrogen. Drying can for example be carried out in a cabinet drier (lab oven), a fluidized-bed drier, a flash drier or other common known drying apparatus.

Drying gas used preferably comprises air, nitrogen or any desired mixture thereof.

In a preferred embodiment the drying in step e) can be carried out in that the graft copolymer B is caused to move in at least one drying gas and the inlet temperature of the drying gas is in the range from 50 to 160° C., preferably from 60 to 150° C.

In a preferred embodiment, the drying of the dewatered graft copolymer B in step e) is achieved using a fluidized-bed drier and/or of a flash drier (pneumatic drier). Fluidized-bed driers and flash driers are known to the person skilled in the art. In particular, these are drying devices for flowable particulate materials of the type described in Krischer/Kröll, Trocknungstechnik [Drying Technology] (Zweiter Band, Trockner and Trocknungsverfahren [Second volume, Driers and drying processes], Springer-Verlag, 1959). Fluidized-bed driers are described by way of example on pages 275 to 282 of the abovementioned document. Pneumatic driers or flash driers as mentioned are described by way of example on page 282 in the abovementioned document. The average residence time of the graft copolymer B in the pneumatic drier is typically from 1 to 300 seconds, preferably from 1 to 120 seconds, particularly preferably from 5 to 60 seconds. In particular, the average residence time of the graft copolymer B in the fluidized-bed drier is from 1 to 60 min, preferably from 5 to 50 min, particularly preferably from 10 to 40 min.

More details for drying of dewatered graft copolymers using fluidized-bed driers and/or flash driers are described in WO 2017/093468 and WO 2018/060111.

Typically, the dried graft copolymer B obtained in step e) has water content below 5%, preferably below 1%, preferably in the range from 0.05 to 0.8% by weight, preferably from 0.1 to 0.5% by weight, particularly preferably from 0.1 to 0.3% by weight.

Step f)—Optionally Cooling of the Dried Graft Copolymer B Powder

Optionally, the inventive method encompasses the cooling of the dried graft copolymer B powder obtained in step e) using a cooling gas, preferably air and/or nitrogen, where the temperature of the cooling gas is equal or less than 50° C., preferably equal or less than 40° C.; more preferably equal or less than 30° C., and wherein the cooling gas is passed through the graft copolymer B powder. For example the cooling gas may pass through the graft copolymer B powder or over the surface of the graft copolymer B powder.

Preferably, the dried graft copolymer B powder obtained in step e) is cooled using a cooling gas, where the temperature of the cooling gas is in the range from 0 to 50° C., preferably in the range from 5 to 40° C., more preferably in the range from 10 to 30° C., also preferably in the range from 10 to 25° C.

Preferably, the graft copolymer B has a temperature of less than 40° C., preferably from 5 to 40° C., more preferably from 10 to 30° C., also preferably in the range from 10 to 25° C. during the cooling step f). Typically, the temperature of the graft copolymer is the maximum temperature during cooling step f), i.e. the temperature of the graft copolymer does not exceed the values given above. Typically, the temperature of graft copolymer B is within said ranges during the whole cooling step e).

In a preferred embodiment the cooling gas is passed through the graft copolymer B powder, wherein a continuous or discontinuous gas flow, preferably air and/or nitrogen gas flow, is maintained. For example the cooling gas can be passed through the graft copolymer B powder in the drier used in step e) (e.g. a fluidized bed drier), by a conveying flow or by circular conveying, for example in a tube, a silo or a storage tank.

Preferably, the cooling gas is passed through the graft copolymer B powder in step f) so that a fluidized powder is obtained. Typically a fluidized powder is understood as a heterogeneous mixture of fluid and solid that exhibits fluid-like properties. For example the upper surface of the fluidized powder is relatively horizontal and the fluidized powder can be represented by a single bulk density. The term fluidized bed or floatation bed is often used as well. Typically fluidization is understood as a process for preparing such heterogeneous mixture. Typically, a fluidized powder is obtained when a fluid (often a gas) is passed upward (i.e. against the direction of gravity) through the particulate medium and the particles are in constant upward and downward motion, resulting in a fluidized state. The flow conditions of the respective system typically have to be adjusted to produce the desired fluidized layer.

In a preferred embodiment the cooling step f) is carried out using a fluidized-bed drier. In particular the cooling step f) is carried out subsequently the drying step e), wherein both steps are carried out using a fluidized-bed drier, in particular using the same fluidized-bed drier. In such a preferred embodiment the step f) encompasses cooling of the dried graft copolymer B powder obtained in step e) using a cooling gas, wherein the cooling gas is passed through the graft copolymer B powder so that a fluidized powder is obtained.

Typically, the graft copolymer B obtained in cooling step f) has water content below 5%, preferably below 1%, preferably in the range from 0.05 to 0.8% by weight, preferably from 0.1 to 0.5% by weight, particularly preferably from 0.1 to 0.3% by weight.

Step g)—Aeration of the Dried Graft Copolymer B

The inventive method encompasses the aeration of the graft copolymer B wherein the graft copolymer B powder obtained in step e) or f) is mixed with an aeration gas, preferably air and/or nitrogen, wherein the bulk density of the graft copolymer B powder is equal or less than 98.5%, preferably equal or less than 97.5%, of the bulk density of the non-aerated graft copolymer B, during the whole aeration step g).

Preferably, the bulk density of the graft copolymer B powder is in the range of 80 to 98.5%, preferably 85 to 97.5% of the bulk density of the non-aerated graft copolymer B powder during the whole aeration step g).

In particular the bulk-density of the non-aerated graft copolymer B is the density of the graft copolymer B powder obtained in step e) or f) after storage (without aeration), e.g. in a cylinder or silo, for at least 48 hours, preferably at least 36 hours, more preferably at least 24 h. In particular the density of the non-aerated graft copolymer B is the density of the graft copolymer B powder obtained in step e) or f) after storage (without aeration) for at least 48 hours, preferably at least 36 hours, more preferably at least 24 h at a storage temperature of equal or less than 50° C., preferably equal or less than 40° C.; more preferably equal or less than 30° C., also preferably at a storage temperature of at least 20° C., preferably in the range from 20° C. to 30° C.

Preferably, the bulk-density of the non-aerated graft copolymer B is the density of the graft copolymer B powder obtained in step e) or f) after storage (without aeration) for 48 hours. Preferably, the bulk-density of the non-aerated graft copolymer B is the density of the graft copolymer B powder obtained in step e) or f) after storage (without aeration) for 48 hours at a storage temperature of 30° C.

Preferably, the bulk-density of the non-aerated graft copolymer B is in the range of 200 to 600 kg/m$^3$, preferably 250 to 500 kg/m$^3$, also preferably 300 to 450 kg/m$^3$.

Typically, the aeration gas is not completely released immediately after mixing the graft copolymer B powder with the aeration gas, but as a rule it is released as a function of time until the bulk density of the non-aerated graft copolymer B powder is reached as saturation level. According to the present invention the bulk density of the graft copolymer B in step g) is equal or less than 98.5% of the bulk density on the non-aerated graft copolymer B powder, wherein said bulk density is maintained over the whole duration of aeration step g).

Preferably, the graft copolymer B powder obtained in step e) or f) is mixed with the aeration gas, wherein the mixing is carried out over the whole duration of step g) or one or more times during the duration of step g). Preferably, it is possible to carry out said mixing one or more times during the duration of step g) as long as a bulk density of equal or less than 98.5% of the bulk density of the non-aerated graft copolymer B powder is maintained.

Preferably, the temperature of the aeration gas is equal or less than 40° C., preferably equal or less than 30° C.; more preferably equal or less than 25° C. Preferably, the temperature of the aeration gas is in the range from 0 to 40° C., preferably in the range from 5 to 40° C., more preferably in the range from 10 to 30° C., also preferably in the range from 10 to 25° C. More preferably the temperature of the aeration gas is equal or less than the temperature of graft copolymer B after the cooling step f).

Preferably, the temperature of the graft copolymer B powder during the aeration step g) is less than 40° C., preferably from 5 to 40° C., more preferably from 10 to 30° C., also preferably from 10 to 25° C. Typically, said temperature of the graft copolymer is the maximum temperature during aeration step g). Typically, the temperature of the graft copolymer B powder is within said ranges during the whole aeration step g).

Preferably, the graft copolymer B powder obtained in step e) or f) is mixed with the aeration gas by stirring and/or by passing the aeration gas through the graft copolymer B powder.

In a preferred embodiment mixing of graft copolymer B powder obtained in step e) or f) with the aeration gas in step g) is carried out in that the aeration gas is passed through the graft copolymer B powder, wherein a continuous or discontinuous gas flow, preferably air and/or nitrogen gas flow, is maintained. For example the aeration gas can be passed through the graft copolymer B powder by a continuous or discontinuous conveying flow or by continuous or discontinuous circular conveying, for example in a tube, a silo or a storage tank.

In a preferred embodiment the graft copolymer B powder obtained in step e) or f) is mixed with the aeration gas in step g) by continuous or discontinuous external circular conveying with air, wherein a part of the graft copolymer B powder is transported from the outlet of a storage container (e.g. a silo) back to the inlet of the storage container (e.g. on the top of the silo).

Further, the graft copolymer B powder obtained in step e) or f) can be mixed with the aeration gas by stirring, e.g. in a stirred vessel. Furthermore, the mixing in step g) can be carried out using a fluidized powder (fluidized bed) which is obtained by the aeration gas passing through the graft copolymer B powder, e.g. using a fluidized-bed drier.

Typically, the aeration step g) is carried out during storage of the graft copolymer B powder (graft copolymer composition) before subsequent processing, for example before compounding the graft copolymer composition with a thermoplastic copolymer A as described below. In particular the mean storage time may last over a period in the range of 1 hour to 3 weeks, preferably over a period in the range of 2 hours to 10 days.

Step h)—Optionally Addition of One or More Optional Components K1

Typically, the inventive process may encompass the addition of one or more optional components K1, preferably selected from additives and auxiliaries (step h).

In particular the graft copolymer composition obtained by the inventive process may comprises 0 to 10% by weight, preferably 0 to 5% by weight, often 0.001 to 5% by weight, more preferably 0.01 to 2% by weight, based on the total graft copolymer composition (preferably based on the solid content of the total graft copolymer composition), of at least one further component K1. Preferably, the at least one component K1 is not a polymeric compound.

The optionally addition of the at least one other component K1 (step h) can be carried out at each stage of the inventive process. In a preferred embodiment the optional step h) encompass the addition of at least one stabilizer, in particular selected from light and heat stabilizers, as component K1 before or during dewatering of the precipitated graft copolymer B (step c). In a preferred embodiment at least one stabilizer, such as heat, UV or light stabilizer, is added after or during the preparation of the graft copolymer by emulsion polymerization in step a).

Optional Further Component K1

For example the at least one further component K1 may be selected from commonly known additives and/or auxiliaries for plastic materials. With respect to conventional auxiliaries and additives, reference is made by way of example to "Plastics Additives Handbook", Hans Zweifel, 6th edition, Hanser Publ., Munich, 2009.

For example the at least one additive K1 may be selected from fillers, reinforcing agents, dyes, pigments, lubricants or mold-release agents, stabilizers, in particular light and heat stabilizers, antioxidants, UV absorbers, plasticizers, impact modifiers, antistatic agents, flame retardants, bactericides, fungicides, optical brighteners, and blowing agents. For example the optional additive K1 can be selected from the additives K2 described below concerning the process for the production of the thermoplastic molding composition.

In a preferred embodiment the additive K1 is selected from common stabilizers (primary stabilizers) for thermoplastic polymers, such as stabilizers for improving thermal stability, which commonly are agents to counteract thermal decomposition, light stabilizers (stabilizers for increasing lightfastness), and stabilizers for raising resistance to hydrolysis and to chemicals. Examples of suitable light stabilizers are various substituted resorcinols, salicylates, benzotriazoles, benzophenones and phenolic antioxidants (such as Irganox® 1076 or Lowinox® TBM-6).

Examples of suitable stabilizers are hindered phenols, but also vitamin E and compounds whose structure is analogous thereto. HALS stabilizers (Hindered Amine Light Stabilizers), benzophenones, resorcinols, salicylates, benzotriazoles and phenolic antioxidants are also suitable.

Further the at least one further component K1 can be selected from additives and auxiliaries used for production of the graft copolymer B in step a) as described above, for example selected from surface active agents, buffers salts, stabilizers, and initiators.

Production of a Thermoplastic Molding Composition

Furthermore the present invention is directed to a process for the production of a thermoplastic molding composition comprising the graft copolymer B composition as described above (or respectively the graft copolymer composition obtained by the inventive process) and at least one thermoplastic styrene copolymer A, optionally at least one further polymeric component C, and optionally at least one further component K2, by mixing the components.

In this context, the invention is directed to a process for the production of a thermoplastic molding composition comprising (preferably consisting of):

A: 5 to 95% by weight, preferably 30 to 95% by weight, more preferably 40 to 90% by weight of at least one thermoplastic copolymer A produced from:
  A1: 50 to 95% by weight, preferably 60 to 90% by weight, more preferably 60 to 85% by weight, based on the copolymer A, of a monomer A1 selected from styrene, alpha-methylstyrene and mixtures of styrene and at least one other monomer selected from α-methylstyrene, p-methylstyrene and $C_1$-$C_8$-alkyl (meth)acrylate,
  A2: 5 to 50% by weight, preferably 10 to 40% by weight, more preferably 15 to 40% by weight, based on the copolymer A, of at least one monomer A2 selected from acrylonitrile and mixtures of acrylonitrile and at least one other monomer selected from methacrylonitrile, acrylamide, vinylmethyl ether, anhydrides of unsaturated carboxylic acids (e.g. maleic anhydride or phthalic acid anhydride) and imides of unsaturated carboxylic acids (e.g. N-substituted maleimides, like N-cyclohexylmaleimide or N-phenylmaleimide),
B: 5 to 95% by weight, preferably 5 to 70% by weight, more preferably 10 to 60% by weight, of at least one graft copolymer B as defined above;
C: 0 to 90% by weight, preferably 0 to 80% by weight, more preferably 20 to 60% by weight, of at least one further polymeric component C, and
K2: 0 to 10% by weight, preferably 0 to 5% by weight, often 0.1 to 5% by weight of at least one further component K2, preferably selected from additives and auxiliaries;
comprising the following steps:
a), b), c), e), g) and optionally d), f) and/or h) as described above; and
i) mixing the thermoplastic copolymer A, the at least one graft copolymer B, and optionally one or more further polymeric component C and/or optionally one or more further components K2.

Methods and devices for mixing the graft copolymer B with the thermoplastic polymer A and optional the further polymer component C and/or the additive K2 are known by a skilled person. For examples possible mixing apparatuses for carrying out the compounding are, e.g. discontinuously operating heated internal mixers with or without stamp, continuous kneaders such as continuous internal mixers, screw kneaders with axially oscillating screws, Banbury mixers, continuous extruders and roll mills, mixing mills with heated rolls and calender.

Typically, mixing step i) encompasses melt-compounding and/or melt-extrusion and can typically be carried out using one or more kneaders, extruders and/or twin shaft screw. For the melt extrusion, for example single- or twin-screw extruders are particularly suitable. The use of a twin-screw extruder is preferred. In some cases, the mechanical energy introduced during mixing by the mixing device already causes a melting of the mixture, so that the mixing device does not need to be heated.

The mixing in step i) may be carried out successively or simultaneously. Furthermore it is suitable to mix some or all of the components at a temperature of 15 to 40° C., for example at room temperature, in a first step, and afterwards raising the temperature up to 200 to 300° C., optionally under addition of further additives, in a second step.

Preferably the mixing in step i) is carried out at temperatures in the range of 100 to 400° C., preferably 180 to 300° C. Typically, said temperature depends on the chemical and physical properties of components. Typically, it should be selected so that a substantially molten polymer mixture is achieved. In this context the term "molten" means that all components, in particular the polymeric components, are molten except those which should not be molten, e.g., glass fibers or pigment particles. On the other hand, the temperature should not be unnecessarily high in order to avoid thermal damage to the polymer mixture. The mechanical energy introduced may be so high that the mixing device must be even cooled. The mixing apparatus is usually operated at temperatures from 150 to 400° C., preferably 180 to 300° C. and has typically different temperature zones as is known to those skilled in the art.

The mixing of the thermoplastic copolymer A, the at least one graft copolymer B and optionally of other components K can be achieved in a known manner, either successively or simultaneously. It is moreover possible to begin by mixing some components at temperatures of from 15 to 40° C., in particular at room temperature (about 20° C.), and then to increase the temperature to from 200 to 300° C., optionally with addition of other components.

Thermoplastic Copolymer A

Preferably the thermoplastic copolymer A comprising at least one vinylaromatic monomer is a resin which is free of any latex type polymer (rubber free resin).

Preferably the thermoplastic copolymer A comprises at least 50% by weight of one or more vinylaromatic monomer(s) A1, preferably selected from styrene, α(alpha)methylstyrene, p(para)-methylstyrene, and optionally at least one further ethylenically unsaturated monomer A2.

Further, a preferred thermoplastic copolymer A is prepared from mixtures of styrene with other co-monomers A2. In particular the at least one thermoplastic copolymer A, can be selected from polystyrene, copolymers of styrene, e.g. styrene acrylonitrile copolymers (SAN), copolymers of α(alpha)-methylstyrene, e.g. α(alpha)-methylstyrene acrylonitrile copolymers (AMSAN). In general, any SAN and/or AMSAN copolymer known in in the art may be used as thermoplastic copolymer A within the subject-matter of the present invention.

Particularly, the thermoplastic copolymer A is selected from SAN and/or AMSAN copolymers comprising less than 36% by weight of acrylonitrile as monomer A2, based on the copolymer A. Preferably the thermoplastic copolymer A comprises the at least one vinylaromatic monomer A1, preferably styrene, in an amount of 50 to 99% by weight, preferably 60 to 95% by weight, also preferably 65 to 90% by weight, more preferably 65 to 70% by weight, and at least one vinyl cyanide monomer A2, preferably acrylonitrile, in an amount of 1 to 50% by weight, preferably 5 to 40% by weight, also preferably 10 to 35% by weight, more preferably 30 to 35% by weight.

In a preferred embodiment the at least on thermoplastic copolymer A comprises (preferably consists of):
  A1: 50 to 99% by weight, preferably 50 to 95% by weight, more preferably 60 to 90% by weight, also preferably 60 to 85% by weight, based on the copolymer A, of the at least one vinylaromatic monomer A1, selected from styrene, α(alpha)-methylstyrene or mixtures of styrene and at least one further monomer selected from α(alpha)-methylstyrene, p(para)-methylstyrene and $C_1$-$C_8$ alkyl(meth)acrylate, A2: 1 to 50% by weight, 50 to 99% by weight, preferably 5 to 50% by weight, more preferably 10 to 40% by weight, also preferably 15 to 40% by weight, based on the copolymer A, of at least one further ethylenically unsaturated monomer A2, selected from acrylonitrile or mixtures of acrylonitrile and at least one further monomer selected from methacrylonitrile, acrylamide, vinylmethyl ether, anhydrides of unsaturated carboxylic acids and imides of unsaturated carboxylic acids.

In particular, a thermoplastic copolymer A comprising 35% by weight or less, acrylonitrile, based on the total copolymer A, is preferred.

In a preferred embodiment of the invention the at least on vinylaromatic monomer A1 is styrene or alpha-methylstyrene, and the at least one further ethylenically unsaturated monomer A2 is acrylonitrile.

In a further preferred embodiment of the invention monomer A1 is a mixture of styrene and α(alpha)-methylstyrene and monomer A2 is acrylonitrile, wherein the mixture preferably comprises at least 10% by weight, preferably at least 50% by weight and more preferably at least 90% by weight, based on the total amount of monomer A1, styrene.

In a preferred embodiment the thermoplastic copolymer A is composed of the monomers A1 and A2, wherein the at least one vinylaromatic monomer A1 is selected from styrene, α(alpha)-methylstyrene, and mixtures thereof; and the at least one further ethylenically unsaturated monomer A2 is acrylonitrile or a mixture of acrylonitrile and methacrylonitrile.

Especially preferred thermoplastic copolymers A are copolymers comprising (preferably consisting of):

A1: 60 to 95% by weight, preferably 60 to 90% by weight, more preferably 60 to 85% by weight, also preferably 65 to 80% by weight, based on the total copolymer A, of the at least one vinylaromatic monomer A1, selected from styrene, α(alpha)-methylstyrene or mixtures of styrene and α(alpha)methylstyrene; and A2: 5 to 40% by weight, preferably 10 to 50% by weight, more preferably 15 to 40% by weight, also preferably 20 to 35% by weight, based on the total copolymer A, of the at least one further ethylenically unsaturated monomer A2, selected from acrylonitrile or mixtures of acrylonitrile and methacrylonitril.

In a preferred embodiment the thermoplastic copolymer A is produced from (preferably consisting of):

A1: 64 to 95% by weight, based on the copolymer A, of monomer A1 selected from styrene and mixtures of styrene and at least one other monomer selected from α-methylstyrene, p-methylstyrene and $C_1$-$C_8$-alkyl(meth)acrylate, A2: 5 to 36% by weight, based on the copolymer A, of monomer A2 selected from acrylonitrile.

In a preferred embodiment the thermoplastic copolymer A is produced from (preferably consisting of):

A1: 67 to 95% by weight, based on the copolymer A, of monomer A1 selected from styrene or alpha-methylstyrene, A2: 5 to 33% by weight, based on the copolymer A, of monomer A2 selected from acrylonitrile.

In particular the weight-average molecular weight ($M_w$) of the thermoplastic copolymer A is in the range of 15,000 to 200,000 g/mol, preferably in the range of 30,000 to 150,000 g/mol. Typically, the number-average molar mass ($M_n$) of the thermoplastic copolymer A amounts from 15,000 to 100,000 g/mol. Preferably the average molecular weight can be determined by gel permeation chromatography (GPC) relative to polystyrene as standard and using for example UV detection. Preferably the thermoplastic copolymer A exhibits a viscosity number VN (determined according to DIN 53726 at 25° C., 0.5% by weight in dimethylformamide) from 50 to 120 ml/g, preferably from 50 to 100 ml/g, more preferably from 55 to 85 ml/g.

In a preferred embodiment the thermoplastic copolymer A is a SAN (styrene acrylonitrile copolymer) or AMSAN (alpha-methylstyrene acrylonitrile copolymer) copolymer, which exhibits average molecular weight and/or viscosity in the above mentioned ranges.

The copolymer A can be prepared by all known method, for example bulk polymerization, solution polymerization, suspension polymerization and emulsion polymerization or mixed process, e.g. mass/suspension polymerizations, with or without further components. Synthesis of thermoplastic copolymers A is possible via thermal initiation or via addition of initiators, especially radical initiators, like for example peroxides. Suitable thermoplastic copolymers A are preferably produced via bulk or solution polymerization.

More preferably the thermoplastic copolymer A is prepared from the components acrylonitrile and styrene and/or α-methylstyrene via bulk polymerization or in the presence of one or more solvents, for example, toluene or ethylbenzene. A polymerization process is for example described in Kunststoff-Handbuch [Plastics Handbook], Vieweg-Daumiller, volume V, (Polystyrol) [Polystyrene], Carl-Hanser-Verlag, Munich 1969, pages 122 et seq.

Details are described for example in U.S. Pat. Nos. 4,009,226 and 4,181,788 concerning the production of SAN and/or AMSAN resins by bulk polymerization or solution polymerization. Further, the synthesis of thermoplastic copolymer A is for example described in DE-A 24 20 358 and DE-A 27 24 360. Suitable thermoplastic copolymers are also described in DE-A 19713509.

Further Polymer Component C

Optionally, the thermoplastic molding composition comprises 0 to 90% by weight, preferably 0 to 60% by weight, often 0.5 to 30% by weight, in another embodiment 30 to 90% by weight, preferably 30 to 60% by weight, based on the total molding composition, at least one further polymer component C. Preferably, the optional polymer component C is selected from polycarbonates (including aromatic polycarbonates and aromatic polyester carbonates), polyamides, and polyesters, more preferably from polycarbonates and polyamides.

In a preferred embodiment the thermoplastic molding composition comprises 5 to 60% by weight, preferably 20 to 60% by weight, more preferably 30 to 60% by weight, based on the total molding composition, at least one further polymer component C selected from polycarbonates, polyamides, and polyesters, preferably from polycarbonates and polyamides.

Preferably, the at least one further polymer component C is at least one aromatic polycarbonate and/or at least one aromatic polyester carbonate. Suitable aromatic polycarbonates and/or aromatic polyester carbonates are described in the state of the art and may be prepared by known processes. For example the preparation of aromatic polycarbonates is described in Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396. For example the preparation of aromatic polyester carbonates is described in DE-A 3 077 934. In particular the preparation of aromatic polycarbonate and/or aromatic polyester carbonate is carried out by reacting diphenols, preferably bisphenol A, carbonic acid halides, preferably phosgene, and optionally aromatic dicarboxylic acid halides, preferably benzenedicarboxylic acid halides. In particular suitable aromatic polycarbonates and aromatic polyester carbonates and their preparation are described in DE-A 2 714 544, DE-A 3 000 610, DE-A 3 832 396 and DE-A 3 077 934.

The aromatic polycarbonate and/or aromatic polyester carbonates used as component C may be either linear or branched in a known manner. Branching agents which may be used are carboxylic acid chlorides which are trifunctional or more than trifunctional, for example described in DE-A 2 940 024 and DE-A 3 007 934, or phenols which are trifunctional or more than trifunctional.

Typically aromatic polycarbonates and polyester carbonates suitable as component C have average weight-average molecular weights ($M_w$, measured e.g. by ultracentrifuge or scattered light measurement) from 10,000 to 200,000 g/mol, preferably 15,000 to 80,000 g/mol, particularly preferably 24,000 to 32,000 g/mol.

The relative solution viscosity ($\eta_{rel}$) of the aromatic polycarbonates and polyester carbonates used as component C is typically in the range of 1.18 to 1.4, preferably 1.20 to 1.32 (measured on solutions of 0.5 g polycarbonate or polyester carbonate in 100 ml methylene chloride solution at 25° C.). The thermoplastic, aromatic polycarbonates and polyester carbonates may be employed by themselves or in any desired mixture of one or more, preferably one to three or one or two thereof. More preferably only one type of polycarbonate is used.

Preferably the aromatic polycarbonate used as component C is a polycarbonate based on bisphenol A and phosgene, which includes polycarbonates that have been prepared from corresponding precursors or synthetic building blocks of bisphenol A and phosgene.

Also preferably, the at least one further polymer component C can be at least one polyamide selected from homo polyamides, co polyamides and mixtures of such polyamides. Suitable polyamides and methods for their production are known from the state of the art. In particular suitable semi-crystalline polyamides are polyamide-6, polyamide-6,6, mixtures and corresponding copolymers of those components. Also included are polyamides wherein the acid component consists wholly or partially of terephthalic acid, isophthalic acid, suberic acid, sebacic acid, azelaic acid, adipic acid and/or cyclohexanedicarboxylic acid, the diamine component consists wholly or partially of m- and/or p-xylylene-diamine, hexamethylenediamine, 2,2,4-trimethylhexamethylenediamine, 2,2,4-trimethylhexamethylene-diamine and/or isophoronediamine, In particular amorphous polyamides can be used as further component C, which are obtained by polycondensation of diamines, such as ethylenediamine, hexamethylenediamine, decamethylenediamine, 2,2,4—and/or 2,4,4-trimethylhexamethylenediamine, m- and/or p-xylylene-diamine, bis-(4-aminocyclohexyl)-methane, bis-(4-aminocyclohexyl)-propane, 3,3'-dimethyl-4,4'-diamino-dicyclohexylmethane, 3-aminomethyl-3,5,5-trimethyl-cyclo-hexylamine, 2,5— and/or 2,6-bis-(aminomethyl)-norbornane and/or 1,4-diamino-methylcyclohexane, with dicarboxylic acids such as oxalic acid, adipic acid, azelaic acid, azelaic acid, decanedicarboxylic acid, heptadecanedicarboxylic acid, 2,2,4—and/or 2,4,4-trimethyladipic acid, isophthalic acid and terephthalic acid.

Preferably, the polyamides suitable as component C have a relative viscosity (measured on a 1% by weight solution in m-cresol or 1% (weight/volume) solution in 96% by weight sulfuric acid at 25° C.) of from 2.0 to 5.0, particularly preferably from 2.5 to 4.0.

Additive(s) K2

In particular the thermoplastic molding composition obtained by the inventive process may comprises 0 to 10% by weight, preferably 0 to 5% by weight, often 0.1 to 5% by weight, based on the total thermoplastic molding composition, of at least one additive K2. More preferably the at least one additive K2 is present in an amount of 0.001 to 10% by weight, more preferably 0.01 to 5% by weight, based on the total thermoplastic molding composition. In particular the additive K is not a polymeric compound.

The optional additive K2 may be selected from commonly known additives and/or auxiliaries for plastic materials. With respect to conventional auxiliaries and additives, reference is made by way of example to "Plastics Additives Handbook", Ed. Gachter and Müller, 4th edition, Hanser Publ., Munich, 1996. For example the at least one additive K may be selected from fillers, reinforcing agents, dyes, pigments, lubricants or mold-release agents, stabilizers, in particular light and heat stabilizers, antioxidants, UV absorbers, plasticizers, impact modifiers, antistatic agents, flame retardants, bactericides, fungicides, optical brighteners, and blowing agents.

The optional additive K2 is preferably selected from dyes, pigments, lubricants or mold-release agents, stabilizers, in particular light stabilizers, antistatic agents, flame retardants and fillers, in particular mineral fillers.

Examples that may be mentioned of fillers, which may be selected from particulate fillers or reinforcing agents, are silicates, amorphous silica, calcium silicates, such as wollastonite, powdered quartz, mica, metal oxides, metal hydroxides, carbon black, graphite, barium sulfate, calcium carbonate, magnesium carbonate, bentonites, talc, kaolin, carbon fibers or glass fibers in the form of glass woven, glass mats, or glass silk rovings, chopped glass, or glass beads. In particular at least one particulate fillers, preferably a mineral filler, can be used as additive K.

Examples of suitable pigments are titanium dioxide, phthalocyanines, ultramarine blue, iron oxides, or carbon black, and also the entire class of organic pigments, preferably titanium dioxide and carbon black.

Common stabilizers for thermoplastic polymers encompass stabilizers for improving thermal stability, which are commonly agents to counteract thermal decomposition, light stabilizers (stabilizers for increasing lightfastness), and stabilizers for raising resistance to hydrolysis and to chemicals. Examples of suitable light stabilizers are various substituted resorcinols, salicylates, benzotriazoles, and benzophenones. Examples of suitable stabilizers are hindered phenols, but also vitamin E and compounds whose structure is analogous thereto. HALS stabilizers (Hindered Amine Light Stabilizers), benzophenones, resorcinols, salicylates, and benzotriazoles are also suitable.

Suitable lubricants or mold-release agents are fatty acids having from 12 to 30 carbon atoms, salts and derivatives thereof, for example stearic acid and stearates, palmitic acid and palmitates, stearyl alcohol, stearic esters, amide waxes (e.g. stearamides, in particular ethylene bis(stearamide) (EBS)), and polyolefin waxes. Particularly suitable lubricants and mold-release agents are stearic acid, stearates (e.g. magnesium stearate), palmitic acid, palmitates (e.g. sodium palmitate), ethylene bis(stearamide) (e.g. Irgawax®, Ciba, Switzerland) and mixtures thereof. Preferably the thermoplastic molding composition comprises 0.05 to 5% by weight, preferably 0.1 to 3% by weight, based on the total thermoplastic molding composition, of at least one lubricant or mold-release agents, more preferably ethylene bis(stearamide), at least one alkaline metal or alkaline earth metal stearate and/or at least one alkaline metal or alkaline earth metal palmitate. In a preferred embodiment the thermoplastic molding composition comprises 0.1 to 5% by weight, based on the total thermoplastic molding composition potassium stearate and/or potassium palmitate.

In particular the thermoplastic molding composition can optionally comprise 0 to 2% by weight, preferably 0.01 to 2% by weight, at least one common processing aid, e.g. selected from lubricant and mold release agents and antistatic agents.

In particular the thermoplastic molding composition can optionally comprise 0 to 10% by weight, preferably 0.1 to 10% by weight, pigments and/or colorants, in particular selected from titanium dioxide, phthalocyanines, ultramarine blue, iron oxides, or carbon black, and also the entire class of organic pigments.

Furthermore, it is possible that the thermoplastic composition comprises as component K2 residues of the at least one additive K1 used for production of the graft copolymer B as described above, selected from surface active agents, buffers salts, stabilizers, initiators.

The invention also provides a graft copolymer composition obtained by the inventive process as described above. In particular the invention provides a graft copolymer composition obtained by the inventive process as described above, wherein the graft copolymer composition has a bulk density of equal or less than 98.5% of the bulk density of the non-aerated graft copolymer B. The preferred embodiments describing the bulk density of the graft copolymer B in aeration step g) apply accordingly.

Further, the invention provides a thermoplastic molding composition and moldings produced therefrom, wherein the thermoplastic molding composition is obtained by the inventive process for the production of a thermoplastic molding composition comprising the graft copolymer B composition as described and at least one thermoplastic styrene copolymer A.

The thermoplastic molding compositions can be used for the production of molded articles such as sheets or semifinished products, films, fibers or else of foams and the corresponding molded articles such as sheets, semi-finished products, films, fibers or foams. Processing may be carried out using the known processes for thermoplastic processing, in particular production may be effected by thermoforming, extruding, injection molding, calendaring, blow molding, compression molding, press sintering, deep drawing or sintering, preferably by injection molding.

The molding compositions of the invention can be used for the production of moldings of any type. These can be produced via injection molding, extrusion and blow molding processes. Another type of processing is the production of moldings via thermoforming from sheets or films previously produced, and the process of film-overmolding. Examples of these moldings are films, profiles, housing parts of any type, e.g. for household devices such as juice presses, coffee machines, mixers; for office equipment such as monitors, printers, copiers; exterior and interior parts of automobiles; sheets, pipes, electrical installation ducts, windows, doors and other profiles for the construction sector (fitting-out of interiors and outdoor applications), and also parts for electrical and electronic uses, such as switches, plugs and sockets.

In particular, the molding compositions of the invention can by way of example be used for the production of the following moldings: Parts for the fitting-out of interiors of rail vehicles, ships, aircraft, buses and other motor vehicles, bodywork components for motor vehicles, housings of electrical equipment containing small transformers, housings for equipment for the processing and transmission of information, housings and cladding for medical equipment, massage equipment and housings therefor, toy vehicles for children, sheet-like wall elements, housings for safety equipment, thermally insulated transport containers, apparatus for the keeping or care of small animals, moldings for sanitary and bath equipment, protective grilles for ventilator openings, moldings for garden sheds and tool sheds, housings for garden equipment.

The invention is described in more detail by the following examples and claims.

EXAMPLES

1. Preparation of Styrene-Co-Acrylonitrile Grafted Polybutylacrylate Latices (Graft Copolymer B)

The following graft copolymer B latex was prepared:

a. Preparation of Graft Base B1-1

The reaction vessel was charged with 90.2 parts of demineralized water, 0.61 parts of the sodium salt of a $C_{12}$-$C_{18}$ paraffin sulfonic acid and 0.23 parts sodium bicarbonate. When the temperature in the reaction vessel reached 59° C. 0.16 parts of sodium persulfate, dissolved in 5 parts of demineralized water, were added. A mixture of 59.51 parts butyl acrylate and 1.21 parts was added within a period of 210 min. Afterwards the reaction was continued for 60 min. Finally the polymer dispersion (graft base B1-1) had a total solid content of 39.6% and the latex particles had a mean particle diameter $D_w$ (determined by turbidity) of 75 nm.

b. Preparation of Graft Base B1-2

The reaction vessel was charged with 70.66 parts of demineralized water, 0.3 parts of the graft base B1-1 (obtained as described above having a particle diameter of 75 nm) and 0.23 parts of sodium bicarbonate. After heating the reaction vessel to 60° C., 0.16 parts of sodium persulfate, dissolved in 5 parts demineralized water, were added to the reaction mixture. A mixture of 59.51 parts butyl acrylate and 1.21 parts tricyclodecenylacrylate was added within a period of 210 min. In parallel to the first feed a solution of 0.36 parts of the sodium salt of a $C_{12}$-$C_{18}$ paraffin sulfonic acid in 16.6 parts demineralized water was also added over a period of 210 min. After 200 min, from starting the feed, the temperature was ramped to 65° C. Afterwards the reaction was continued for 60 min at 65° C. Finally the polymer dispersion (graft base B1-2) had a total solid content of 39.4% and the latex particles had a mean particle diameter $D_w$ (determined by turbidity) of 440 nm.

c. Preparation of Graft Shell B2

An amount of 154 parts of the graft base B1-2 as described above was added to the reaction vessel together with 88.29 parts of demineralized water, 0.11 parts of the sodium salt of a $C_{12}$-$C_{18}$ paraffin sulfonic acid and 0.14 parts of sodium persulfate, dissolved in 5.61 parts of demineralized water. The reaction mixture was heated to 61° C. Within a period of 60 min 13.16 parts were added at a temperature of 61° C., followed by a post polymerization time of 90 min, where the temperature was increased from 61° C. to 65° C. Then a mixture of 20.5 parts of styrene and 6.83 parts of acrylonitrile were added to the reaction over a period of 150 min. The reaction was continued at 65° C. for another 60 min. A polymer dispersion with a total solid content of 35.2% was obtained. The latex particles had a mean particle diameter $D_w$ (determined by turbidity) of 500 nm.

d. Precipitation of the Graft Copolymer B Latex, Dewatering and Drying 112.5 g of a $MgSO_4$ solution (19.9% by weight) is mixed with 2143.1 g demineralized water. 451.1 g of this solution is used as pre-charge and heated to 60° C. 900 g of a polymer latex of step b) and 1804.5 g of the remaining diluted MgSO4 solution are added separately within 10 min, while the temperature is kept at 60° C. Then the resulting mixture is heated to 92° C. for 5 min.

The resulting slurry is filtered off and washed with once with 500 ml demineralized water. Graft copolymer B powder is obtained after drying the dewatered graft copolymer B in a lab oven at 70° C. for 2 days. The dried graft copolymer B had a water content of about 0.25% by weight.

2. Powder Flow Analysis

Flowability has been determined according to ASTM 6773-2008 using a ring shear tester at consolidation stress σ1 of about 12 kPa. The consolidation stress σ1 was constant for all samples and has been calculated for a 100 m³ silo with a diameter of 3.5 m and average graft copolymer B powder density.

The practical determination of flow properties can be carried out in a ring shear tester. Generally, the uniaxial compression test can be used as a model to define powder flowability. The powder is put into a container having walls which are assumed to be frictionless and consolidated with a normal stress $\sigma_1$ (consolidation stress) for a short period of time. After removing the walls a constantly increasing normal stress σ is applied. At failure the normal stress $\sigma_c$ (unconfined yield strength) is measured. The ratio FFC=$\sigma_1$/$\sigma_c$ gives the flowability of the powder. As a rule, the greater FFC (Jenike flow factor FFC value) the better is the flowability of the powder. When different powders are to be compared the consolidation stress has to be constant.

When a bulk solid is stored for certain period of time the unconfined yield strength is typically increased with respect to the original value for some powders. This behavior is called time consolidation. Time consolidation can also be measured in a ring shear tester when the powder is stored at a consolidation stress $\sigma_1$ for a certain period of time after pre-shear and before shear to failure.

The initial flowability FFC (0 h) of graft copolymer B powder as obtained in example 1 above (after drying) was measured according to ASTM 6773-2008 as described above at different temperatures T of 60° C., 40° C., 21° C. and 15° C. Further, the flowability FFC (6 h) was determined after 6 h under 12 kPa normal load (according to ASTM 6773-2008) at the temperatures T (60° C., 40° C., 21° C. or 15° C.). The results are given is given for the following table 1.

TABLE 1

Flowability FFC (0 h) and FFC (6 h) of graft copolymer B powder at different temperatures

| Example | T (storage) [° C.] | FFC (0 h) | FFC (6 h) |
|---|---|---|---|
| 1 | 60 | 3.9 | 1.2 |
| 2 | 40 | 4.0 | 1.4 |
| 3 | 21 | 4.5 | 2.1 |
| 4 | 15 | 5.2 | 2.1 |

The higher the FFC value, the better is the flowability of a particular powder. Usually a powder having an FFC value above 4 is considered as easy flowing. It can be clearly seen that cooling (below 40° C., preferably cooling at 15 to 21° C.) significantly improves flowability of graft copolymer B powder. Furthermore, time consolidation is also reduced at temperature below 40° C. The flowability FFC (6 h) at temperatures below 40° C. is 33 to 43% higher compared to flowability FFC (6 h) at temperatures of 40° C. and higher.

3. Aeration Trials a. Aeration in a Bubble Column

The graft copolymer B powder obtained in example 1 (after drying) was filled in a acrylic glass cylinder. The filing level was determined via the volume scaling of the cylinder. The initial filing height was measured after consolidation time of 10 minutes (non-aerated state). Afterwards the powder in the cylinder was aerated with an air flow of 3-4 m³/h, at a temperature in the range of 11-12.5° C. and at atmospheric pressure (977-987 mbar) until bubble formation on the surface of the powder was visible. The filing height was measured again (aerated state).

The aeration was stopped and the filing height was measured after different waiting times (1 to 30 minutes). The trial was repeated with a different amount of the sample of graft copolymer B. The results are summarized in Table 2. The bulk density given in kg/m³ was determined using the filing level and the mass of the graft copolymer sample.

TABLE 2

Aeration in a bubble column

| | | Series 1 | | Series 2 | |
|---|---|---|---|---|---|
| | time t after stop of aeration [min] | bulk density [kg/m³] | bulk density relative to non-aerated state [%] | bulk density [kg/m³] | bulk density relative to non-aerated state [%] |
| non-aerated state | 0 | 433 | 100% | 431 | 100% |
| aerated state after aeration | 0 | 387 | 89% | 364 | 84% |
| | 1 | 407 | 94% | 400 | 93% |
| | 5 | 408 | 94% | 402 | 93% |
| | 10 | 410 | 95% | 404 | 94% |
| | 20 | 411 | 95% | 404 | 94% |
| | 30 | 412 | 95% | 404 | 94% |

The bulk density after aeration remains about 5% lower compared to the bulk density in the non-aerated state before aeration.

b. Flowability Test

A glass cylinder (1 L) was filed with about 600 ml of graft copolymer B powder obtained in example 1 (after drying) and stored for a period of 24 h at a certain temperature (20 or 40° C.). After storage the powder can be considered as fully vented (non-aerated state). The cylinder was brought to a tilt angle of 45° and the time is measured for the powder to completely flow out of the cylinder. This powder was again filled in the cylinder and aerated by agitating the cylinder for 5 min. After agitation the powder can be considered as completely aerated. After agitation the "flowing out time" was measured again.

This procedure was repeated for different storage times after aeration (agitation). The temperature of the powder and the cylinder is controlled by a lab oven. The results are summarized in the following Table 3. It can be clearly seen that the completely fluidized powder has the best flow properties (short "flowing out time"). With increased storage time (increasing bulk density, see Table 2) the flowability is reduced (longer "flowing out time"). Both temperatures (20 and 40° C.) give the same overall picture. However, at lower temperature the initial flowability is higher.

TABLE 3

Results from flow properties trials measured at 20 and 40° C.

| | | Flow-out time at 45° from a 1 l cylinder | |
|---|---|---|---|
| | time t after stop of aeration [min] | 20° C. [sec] | 40° C. [sec] |
| non-aerated | 0 | 7.39 | No flow |
| aerated state | 0 | 2.76 | 4.64 |
| after aeration (by agitation) | 10 | 2.88 | 9.55 |
| | 30 | 3.67 | 10.7 |

The invention claimed is:

1. A process for the production of a graft copolymer composition comprising:
   B: from 90 to 100% by weight of at least one graft copolymer B comprising:
      B1: 50 to 90% by weight, based on the graft copolymer B, of at least one graft base B1, obtained by emulsion polymerization of:
         B11: 50 to 100% by weight, based on the graft base B1, at least one monomer B11 selected from $C_1$-$C_8$ alkyl(meth)acrylate and butadiene;
         B12: 0 to 10% by weight, based on the graft base B1, of at least on polyfunctional cross-linking monomer B12; and
         B13 0 to 50% by weight, based on the graft base B1, of at least one further monomer B13, selected from styrene, α-methylstyrene, C1-C4-alkylstyrene, acrylonitrile, methacrylonitrile, isoprene, butadiene, chloroprene, methylmethacrylate, alkylenglycol-di(meth)acrylate, and vinylmethylether;
         where the sum of B11, B12, and B13 equals 100% by weight; and
      B2: 10 to 50% by weight, based on the graft copolymer B, at least one graft shell B2, which is obtained via emulsion polymerization in the presence of the at least one graft base B1 of:
         B21 50 to 100% by weight, based on graft shell B2, of at least one vinylaromatic monomer B21, selected from styrene, α-methylstyrene or mixtures of styrene and at least one further monomer selected from α-methylstyrene, p-methylstyrene, and $C_1$-$C_8$ alkyl(meth)acrylate; and
         B22 0 to 50% by weight, based on graft shell B2, of at least one monomer B22 selected from acrylonitrile or mixtures of acrylonitrile and at least one further monomer selected from methacrylonitrile, acrylamide, vinylmethyl ether, anhydrides of unsaturated carboxylic acids, and imides of unsaturated carboxylic acids;
         where the total sum of graft base B1 and graft shell B2 equals 100% by weight;
   K1: from 0 to 10% by weight, of at least one other component K1;
comprising the following steps:
   a) preparation of the at least one graft copolymer B encompassing emulsion polymerization of the monomers B21 and B22 in the presence of the at least one graft base B1 to form the at least one graft shell B2, wherein the graft copolymer B is obtained in form of a latex;
   b) precipitation of the at least one graft copolymer B latex after its emulsion polymerization in step a), wherein the graft copolymer B latex is mixed with at least one precipitation solution PS resulting in a precipitation mixture;
   c) mechanical dewatering of the precipitated graft copolymer B, where the graft copolymer B having a water content equal or less than 50% by weight is obtained;
   d) optionally washing of the dewatered graft copolymer B;
   e) drying of the dewatered graft copolymer B obtained in step c) or d) using a drying gas having a temperature in the range from 50 to 160° C. wherein a graft copolymer B powder is obtained;
   f) optionally cooling of the dried graft copolymer B powder obtained in step e) using a cooling gas, where the temperature of the cooling gas is equal or less than 50° C. and wherein the cooling gas is passed through the graft copolymer B powder;
   g) aeration of the graft copolymer B, wherein the graft copolymer B powder obtained in step e) or f) is mixed with an aeration gas, wherein the bulk density of the graft copolymer B powder is equal or less than 98.5% of the bulk density of the non-aerated graft copolymer B, during the whole aeration step g); and
   h) optionally addition of one or more optional components K1.

2. The process of claim 1, wherein the at least one graft base B1 is obtained by emulsion polymerization of:
   B11: 70 to 99.9% by weight, based on the graft base B1, at least one $C_1$-$C_8$ alkyl(meth)acrylate as monomer B11;
   B12: 0.1 to 10% by weight, based on the graft base B1, of at least on poly-functional cross-linking monomer B12; and
   B13: 0 to 29.5% by weight, based on the graft base B1, of at least one further monomer, selected from styrene, α-methylstyrene, $C_1$-$C_4$-alkylstyrene, acrylonitrile, methacrylonitrile, isoprene, butadiene, chloroprene, methylmethacrylate, alkylenglycol-di(meth)acrylate, and vinylmethylether;
   where the sum of B11, B12, and B13 equals 100% by weight.

3. The process of claim 1, wherein the at least one graft copolymer B comprises:
   B1: 50 to 70% by weight, based on the graft copolymer B, exactly one graft base B1; and
   B2: 30 to 50% by weight, based on the graft copolymer B, exactly one graft shell B2, obtained by emulsion polymerization, in presence of the graft base B1, of:
      B21: 50 to 95% by weight, based on the graft shell B2, at least one vinylaromatic monomer B21, selected from styrene, α-methylstyrene, or mixtures of styrene with α-methylstyrene or methyl(meth)acrylate; and
      B22: 5 to 50% by weight, based on the graft shell B2, at least one ethylenically unsaturated monomer B22, selected from acrylonitrile or mixtures of acrylonitrile and methacrylonitrile;
   wherein the total sum of graft base B1 and graft shell B2 is 100% by weight, and wherein the graft copolymer B latex obtained in step a) has a particle size in the range of 60 to 140 nm.

4. The process of claim 1, wherein the graft copolymer B comprises:
   B1: 50 to 70% by weight, based on the graft copolymer B, at least one graft base B1;
   B2': 10 to 20% by weight, based on the graft copolymer B, at least one graft shell B2', which is obtained by emulsion polymerization, in presence of graft base B1, of:
   B21': 100% by weight, based on graft shell B2', at least one vinylaromatic monomer B21', selected from styrene, α-methylstyrene, or a mixture of styrene and at least one further monomer selected from α-methylstyrene, p-methylstyrene, and $C_1$-$C_4$-alkyl(meth)acrylate; and
   B2": 20 to 30% by weight, based on the graft copolymer B, at least one graft shell B2", which is obtained by emulsion polymerization, in presence of graft base B1 grafted with B2', of:
   B21": 70 to 80% by weight, based on the graft shell B2", at least one vinylaromatic monomer B21", selected from styrene, α-methylstyrene, or mixtures of styrene and α-methylstyrene or methyl(meth)acrylate; and
   B22": 20 to 30% by weight, based on the graft shell B2", at least one ethylenically unsaturated monomer B22", selected from acrylonitrile or mixtures of acrylonitrile and methacrylonitrile;
   wherein the total sum of graft base B1, graft shell B2', and graft shell B2" is 100% by weight, and wherein the graft copolymer B latex obtained in step a) has a particle size in the range of 300 to 700 nm.

5. The process of claim 1, wherein the graft copolymer composition obtained by the process is a graft copolymer B powder having a water content below 5% by weight.

6. The process of claim 1, wherein the cooling step f) is carried out subsequently to the drying step e), wherein both steps are carried out using a fluidized-bed drier.

7. The process of claim 1, wherein the bulk density of the graft copolymer B powder is in the range of 98.5 to 80% of the bulk density of the non-aerated graft copolymer B powder during the whole aeration step g).

8. The process of claim 1, wherein the temperature of the aeration gas is equal to or less than 40° C.

9. The process of claim 1, wherein the graft copolymer B powder obtained in step e) or f) is mixed with the aeration gas in step g) by stirring and/or by passing the aeration gas through the graft copolymer B powder.

10. The process of claim 1, wherein the graft copolymer B powder obtained in step e) or f) is mixed with the aeration gas in step g) by continuous or discontinuous external circular conveying with air, wherein a part of the graft copolymer B powder is transported from the outlet of a storage container back to the inlet of the storage container.

11. A process for the production of a thermoplastic molding composition comprising:
   A: 5 to 95% by weight, of at least one thermoplastic copolymer A produced from:
   A1: 50 to 95% by weight, based on the copolymer A, of a monomer A1 selected from styrene, α-methylstyrene, and mixtures of styrene and at least one other monomer selected from α-methylstyrene, p-methylstyrene, and $C_1$-$C_8$-alkyl (meth)acrylate; and
   A2: 5 to 50% by weight, based on the copolymer A, of at least one monomer A2 selected from acrylonitrile and mixtures of acrylonitrile and at least one other monomer selected from methacrylonitrile, acrylamide, vinylmethyl ether, anhydrides of unsaturated carboxylic acids, and imides of unsaturated carboxylic acids;
   B: 5 to 95% by weight, of at least one graft copolymer B as defined in claim 1;
   C: 0 to 90% by weight, of at least one further polymeric component C; and
   K2: 0 to 10% by weight, of at least one further component K2;
   comprising the following steps:
   a), b), c), e), g), and optionally d), f), and/or h) as described in claim 1; and
   mixing the thermoplastic copolymer A, the at least one graft copolymer B, and optionally one or more further polymeric component C and/or optionally one or more further components K2.

12. The process of claim 11, wherein the thermoplastic copolymer A is produced from:
   A1: 64 to 95% by weight, based on the copolymer A, of monomer A1 selected from styrene and mixtures of styrene and at least one other monomer selected from α-methylstyrene, p-methylstyrene, and $C_1$-$C_8$-alkyl (meth)acrylate; and
   A2: 5 to 36% by weight, based on the copolymer A, of monomer A2 selected from acrylonitrile.

13. The process of claim 11, wherein the thermoplastic molding composition comprises:
   C: 20 to 60% by weight, based on the total molding composition, at least one further polymer component C selected from polycarbonates, polyamides, and polyesters.

14. The process of claim 11, wherein the mixing in step i) is carried out at temperatures in the range of 180 to 300° C.

15. A graft copolymer composition obtained by a process of claim 1.

16. A graft copolymer composition of claim 15, wherein the graft copolymer composition has a bulk density of equal to or less than 98.5% of the bulk density of the non-aerated graft copolymer B.

* * * * *